US012406616B2

(12) United States Patent
Ban et al.

(10) Patent No.: US 12,406,616 B2
(45) Date of Patent: Sep. 2, 2025

(54) GATE DRIVING CIRCUIT AND DISPLAY PANEL

(71) Applicant: LG DISPLAY CO., LTD., Seoul (KR)

(72) Inventors: Myungho Ban, Paju-si (KR); Hyunsuk Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/379,066

(22) Filed: Oct. 11, 2023

(65) Prior Publication Data

US 2024/0169896 A1 May 23, 2024

(30) Foreign Application Priority Data

Nov. 23, 2022 (KR) ........................ 10-2022-0158063

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2310/0267* (2013.01); *G09G 2310/0291* (2013.01)

(58) Field of Classification Search
CPC ..................... G09G 3/3266; G09G 2310/0267
See application file for complete search history.

(56) References Cited

U.S. PATENT DOCUMENTS

2007/0296681 A1* 12/2007 Kim ..................... G11C 19/184 345/100
2016/0240129 A1* 8/2016 Kim ..................... G09G 3/2092
2017/0032733 A1* 2/2017 Jang .......................... G09G 3/20
2018/0337682 A1* 11/2018 Takasugi ................ H03K 21/18
2019/0164478 A1* 5/2019 Kim ..................... H10K 59/131
2020/0074937 A1* 3/2020 Choi .................... G09G 3/3266
2020/0135115 A1* 4/2020 Chang .................. G09G 3/3266
2021/0201767 A1* 7/2021 Park .......................... G09G 3/32
2024/0038117 A1* 2/2024 Li ............................ G09G 3/20
2024/0194105 A1* 6/2024 Shi ........................... G09G 3/20

* cited by examiner

*Primary Examiner* — William Boddie
*Assistant Examiner* — Bipin Gyawali
(74) *Attorney, Agent, or Firm* — Morgan, Lewis & Bockius LLP

(57) ABSTRACT

Embodiments of the disclosure relate to a gate driving circuit and a display panel, which may prevent malfunctions without causing any circuit issue during a non-driving period when the scan signal line is not driven by including a scan output buffer including a scan pull-up transistor and a scan pull-down transistor and outputting a first scan signal and a control circuit configured to control the scan output buffer and including a first transistor for charging a QB node and two or more transistors connected between a gate node of the first transistor and a low-potential node to which a low-potential voltage is applied.

20 Claims, 15 Drawing Sheets

GATE DRIVING CIRCUIT AND DISPLAY PANEL

CROSS-REFERENCE TO RELATED APPLICATION

This application claims priority from Korean Patent Application No. 10-2022-0158063, filed on Nov. 23, 2022, which is hereby incorporated by reference for all purposes as if fully set forth herein.

BACKGROUND

Technical Field

Embodiments of the disclosure relate to a gate driving circuit and a display panel.

Discussion of the Related Art

As the information society develops, demand for display devices for displaying images is increasing in various forms. Various display devices, such as liquid crystal display devices and organic light emitting display devices, are being utilized in recent years.

A display device may include a display panel where a plurality of data lines and a plurality of gate lines are disposed, a data driving circuit outputting data signals to the plurality of data lines, and a gate driving circuit outputting scan signals to the plurality of scan signal lines.

To normally display an image on the display device, a normal operation of the gate driving circuit is absolutely necessary. However, if a problem occurs in the scanning operation (gate driving operation) by the gate driving circuit, an image abnormality may occur and the image quality may greatly deteriorate.

SUMMARY

Accordingly, embodiments of the present disclosure are directed to a display device that substantially obviates one or more of the problems due to limitations and disadvantages of the related art.

An aspect of the present disclosure is to provide a gate driving circuit including an inverter circuit having a circuit structure capable of preventing malfunctions without causing a circuit problem during a non-driving period when the scan signal lines are not driven and a display panel including an embedded gate driving circuit.

Another aspect of the present disclosure is to provide a gate driving circuit capable of preventing unwanted leakage current in the transistor involving on-off control of a QB node charging transistor and a display panel including an embedded gate driving circuit.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a gate driving circuit may comprise a scan output buffer outputting a first scan signal to a scan output node electrically connected to a first scan signal line among a plurality of scan signal lines disposed on a display panel, and including a scan pull-up transistor and a scan pull-down transistor and a control circuit configured to control the scan output buffer.

The control circuit may include a first control node and a second control node and includes an inverter circuit for charging or discharging a QB node.

The inverter circuit may include a first transistor controlling a connection between a high-potential node and the QB node, a second transistor controlling a connection between the QB node and a low-potential node, a third transistor controlling a connection between the high-potential node and the first control node, a fourth transistor controlling a connection between the second control node and the low-potential node, and a fifth transistor controlling a connection between the first control node and the second control node.

In the inverter circuit, a gate node of the first transistor may be electrically connected to the first control node, a gate node of the second transistor may be electrically connected to a Q node, and a gate node of the fourth transistor is electrically connected to the Q node.

In the inverter circuit, a gate node of the third transistor may be electrically connected to the high-potential node, and a gate node of the fifth transistor may be electrically connected to the Q node or a node different from the Q node.

In this case, the inverter circuit may further include a control capacitor between the QB node and the second control node.

In the inverter circuit, a gate node of the fifth transistor may be electrically connected to the high-potential node, and a gate node of the third transistor may be electrically connected to a node different from the QB node or the high-potential node.

During a non-driving period when the first scan signal line is not driven, the first control node in the inverter circuit may have a voltage higher than a high-potential voltage applied to the high-potential node.

During the non-driving period, the second control node in the inverter circuit may have a voltage lower than the high-potential voltage.

During the non-driving period, a voltage difference between a drain node and a source node of the fourth transistor in the inverter circuit may be smaller than a voltage difference between the high-potential voltage and a low-potential voltage applied to the low-potential node.

During a non-driving period when the first scan signal line is not driven, the QB node may have a voltage between a voltage of the first control node and a voltage of the second control node.

In another aspect, a display panel may comprise a plurality of scan signal lines and a gate driving circuit outputting a scan signal to each of the plurality of scan signal lines.

The gate driving circuit may include a scan output buffer outputting a first scan signal to a scan output node electrically connected to a first scan signal line among the plurality of scan signal lines and including a scan pull-up transistor and a scan pull-down transistor and a control circuit configured to control the scan output buffer.

The control circuit may include a first control node and a second control node and includes an inverter circuit for charging or discharging a QB node.

The inverter circuit may include a first transistor controlling a connection between a high-potential node and the QB node, a second transistor controlling a connection between the QB node and a low-potential node, a third transistor controlling a connection between the high-potential node and the first control node, a fourth transistor controlling a connection between the second control node and the low-potential node, and a fifth transistor controlling a connection between the first control node and the second control node.

In the inverter circuit, the gate node of the first transistor may be electrically connected to the first control node. A gate node of the second transistor may be electrically connected to a Q node. A gate node of the fourth transistor may be electrically connected to the Q node.

In the inverter circuit, a gate node of the third transistor may be electrically connected to the high-potential node. A gate node of the fifth transistor may be electrically connected to the Q node or a node different from the Q node.

The inverter circuit may further include a control capacitor between the QB node and the second control node.

In the inverter circuit, a gate node of the fifth transistor may be electrically connected to the high-potential node, and a gate node of the third transistor may be electrically connected to a node different from the QB node or the high-potential node.

During a non-driving period when the first scan signal line is not driven, the first control node may have a voltage higher than a high-potential voltage applied to the high-potential node.

During the non-driving period when the first scan signal line is not driven, the second control node may have a voltage lower than the high-potential voltage.

During the non-driving period when the first scan signal line is not driven, a voltage difference between a drain node and a source node of the fourth transistor may be smaller than a voltage difference between the high-potential voltage and the low-potential voltage.

During a non-driving period when the first scan signal line is not driven, the QB node may have a voltage between a voltage of the first control node and a voltage of the second control node.

A gate driving circuit according to embodiments of the disclosure may comprise a scan output buffer outputting a first scan signal to a scan output node electrically connected to a first scan signal line among a plurality of scan signal lines disposed on a display panel, and including a scan pull-up transistor and a scan pull-down transistor and a control circuit configured to control the scan output buffer.

In the gate driving circuit according to embodiments of the disclosure, the control circuit may include a first control node and a second control node and includes an inverter circuit for charging or discharging a QB node.

In the gate driving circuit according to embodiments of the disclosure, the inverter circuit may include a first transistor for charging the QB node and two or more transistors connected between a gate node of the first transistor and a low-potential node to which a low-potential voltage is applied.

In the gate driving circuit according to embodiments of the disclosure, the inverter circuit may include a first transistor controlling a connection between a high-potential node and the QB node, a second transistor controlling a connection between the QB node and a low-potential node, a third transistor controlling a connection between the high-potential node and the first control node, a fourth transistor controlling a connection between the second control node and the low-potential node, and a fifth transistor controlling a connection between the first control node and the second control node.

The two or more transistors connected between the gate node of the first transistor and the low-potential node may include a fourth transistor and a fifth transistor.

According to embodiments of the disclosure, there may be provided a gate driving circuit including an inverter circuit having a circuit structure capable of preventing malfunctions without causing a circuit problem during a non-driving period when the scan signal lines are not driven and a display panel including an embedded gate driving circuit.

According to embodiments of the disclosure, there may be provided a gate driving circuit capable of preventing unwanted leakage current in the transistor involving on-off control of a QB node charging transistor and a display panel including an embedded gate driving circuit.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
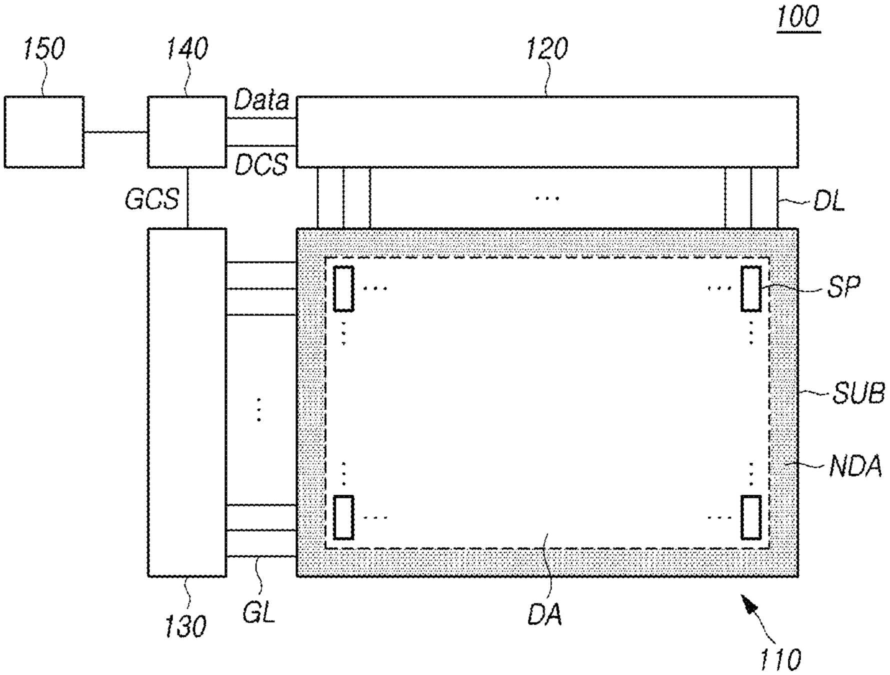
FIG. 1 is a view schematically illustrating a system configuration of a display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “A”, or “B” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors e.g., process factors, internal or external impact, noise, etc.) even when a relevant description is not specified. Further, the term “may” fully encompasses all the meanings of the term “can”.

Hereinafter, various embodiments of the disclosure are described in detail with reference to the accompanying drawings.

FIG. 1 is a view schematically illustrating a system configuration of a display device 100 according to embodiments of the disclosure.

Referring to FIG. 1, a display device 100 according to embodiments of the disclosure may include a display panel 110 and driving circuits for driving the display panel 110.

The driving circuits may include a data driving circuit 120 and a gate driving circuit 130. The display device 100 may further include a controller 140 controlling the data driving circuit 120 and the gate driving circuit 130.

The display panel 110 may include a substrate SUB and signal lines, such as a plurality of data lines DL and a plurality of gate lines GL disposed on the substrate SUB. The display panel 110 may include a plurality of subpixels SP connected to the plurality of data lines DL and the plurality of gate lines GL.

The display panel 110 may include a display area DA in which images are displayed and a non-display area NDA in which no image is displayed. In the display panel 110, a plurality of subpixels SP for displaying images may be disposed in the display area DA, and the driving circuits 120, 130, and 140 may be electrically connected or disposed in the non-display area NDA. Further, pad units for connection of integrated circuits or a printed circuit may be disposed in the non-display area NDA.

The data driving circuit 120 is a circuit for driving the plurality of data lines DL, and may supply data signals to the plurality of data lines DL. The gate driving circuit 130 is a circuit for driving the plurality of gate lines GL, and may supply gate signals to the plurality of gate lines GL. The controller 140 may supply a data control signal DCS to the data driving circuit 120 to control the operation timing of the data driving circuit 120. The controller 140 may supply a gate control signal GCS for controlling the operation timing of the gate driving circuit 130 to the gate driving circuit 130.

The controller 140 may start scanning according to a timing implemented in each frame, convert input image data input from the outside into image data Data suited for the data signal format used in the data driving circuit 120, supply the image data Data to the data driving circuit 120, and control data driving at an appropriate time suited for scanning.

The controller 140 receives, from the outside (e.g., a host system 150), various timing signals including a vertical synchronization signal VSYNC, a horizontal synchronization signal HSYNC, an input data enable signal DE, and a clock signal, along with the input image data.

To control the data driving circuit 120 and the gate driving circuit 130, the controller 140 receives timing signals, such as the vertical synchronization signal VSYNC, horizontal synchronization signal HSYNC, input data enable signal DE, and clock signal CLK, generates various control signals DCS and GCS, and outputs the control signals to the data driving circuit 120 and the gate driving circuit 130.

As an example, to control the gate driving circuit 130, the controller 140 outputs various gate control signals GCS including a gate start pulse GSP, a gate shift clock GSC, and a gate output enable signal (Gate Output Enable, GOE).

To control the data driving circuit 120, the controller 140 outputs various data control signals DCS including, e.g., a source start pulse SSP, a source sampling clock SSC, and a source output enable signal (Source Output Enable, SOE).

The controller 140 may be implemented as a separate component from the data driving circuit 120, or the controller 140, along with the data driving circuit 120, may be implemented as an integrated circuit.

The data driving circuit 120 receives the image data Data from the controller 140 and supply data voltages to the plurality of data lines DL, thereby driving the plurality of data lines DL. The data driving circuit 120 is also referred to as a ‘source driving circuit.’

The data driving circuit 120 may include one or more source driver integrated circuit (SDICs).

Each source driver integrated circuit (SDIC) may include a shift register, a latch circuit, a digital-to-analog converter (DAC), and an output buffer. In some cases, each source driver integrated circuit (SDIC) may further include an analog-digital converter ADC.

For example, each source driver integrated circuit (SDIC) may be connected with the display panel 110 by a tape automated bonding (TAB) method or connected to a bonding pad of the display panel 110 by a chip on glass (COG)

or chip on panel (COP) method or may be implemented by a chip on film (COF) method and connected with the display panel 110.

The gate driving circuit 130 may output a gate signal of a turn-on level voltage or a gate signal of a turn-off level voltage according to the control of the controller 140. The gate driving circuit 130 may sequentially drive the plurality of gate lines GL by sequentially supplying gate signals of the turn-on level voltage to the plurality of gate lines GL.

The gate driving circuit 130 may be connected with the display panel 110 by TAB method or connected to a bonding pad of the display panel 110 by a COG or COP method or may be connected with the display panel 110 according to a COF method. Alternatively, the gate driving circuit 130 may be formed in a gate in panel (GIP) type, in the non-display area NDA of the display panel 110. The gate driving circuit 130 may be disposed on the substrate SUB or may be connected to the substrate SUB. In other words, the gate driving circuit 130 that is of a GIP type may be disposed in the non-display area NDA of the substrate SUB. The gate driving circuit 130 that is of a chip-on-glass (COG) type or chip-on-film (COF) type may be connected to the substrate SUB.

Meanwhile, at least one of the data driving circuit 120 and the gate driving circuit 130 may be disposed in the display area DA. For example, at least one of the data driving circuit 120 and the gate driving circuit 130 may be disposed not to overlap the subpixels SP or to overlap all or some of the subpixels SP.

When a specific gate line GL is opened by the gate driving circuit 130, the data driving circuit 120 may convert the image data Data received from the controller 140 into an analog data voltage and supply it to the plurality of data lines DL.

The data driving circuit 120 may be connected to one side (e.g., an upper or lower side) of the display panel 110. Depending on the driving scheme or the panel design scheme, data driving circuits 120 may be connected with both the sides (e.g., both the upper and lower sides) of the display panel 110, or two or more of the four sides of the display panel 110.

The gate driving circuit 130 may be connected to one side (e.g., a left or right side) of the display panel 110. Depending on the driving scheme or the panel design scheme, gate driving circuits 130 may be connected with both the sides (e.g., both the left and right sides) of the display panel 110, or two or more of the four sides of the display panel 110.

The controller 140 may be a timing controller used in typical display technology, a control device that may perform other control functions as well as the functions of the timing controller, or a control device other than the timing controller, or may be a circuit in the control device. The controller 140 may be implemented as various circuits or electronic components, such as an integrated circuit (IC), a field programmable gate array (FPGA), an application specific integrated circuit (ASIC), or a processor.

The controller 140 may be mounted on a printed circuit board or a flexible printed circuit and may be electrically connected with the data driving circuit 120 and the gate driving circuit 130 through the printed circuit board or the flexible printed circuit.

The controller 140 may transmit/receive signals to/from the data driving circuit 120 according to one or more predetermined interfaces. The interface may include, e.g., a low voltage differential signaling (LVDS) interface, an embedded clock point to point interface (EPI), and a serial peripheral interface (SPI).

The controller 140 may include a storage medium, such as one or more registers.

The display device 100 according to embodiments of the disclosure may be a display including a backlight unit, such as a liquid crystal display, or may be a self-emission display, such as an organic light emitting diode (OLED) display, a quantum dot display, or a micro light emitting diode (LED) display.

If the display device 100 according to embodiments of the disclosure is an OLED display, each subpixel SP may include an organic light emitting diode (OLED), which by itself emits light, as the light emitting element. If the display device 100 according to embodiments of the disclosure is a quantum dot display, each subpixel SP may include a light emitting element formed of a quantum dot, which is a self-luminous semiconductor crystal. If the display device 100 according to embodiments of the disclosure is a micro LED display, each subpixel SP may include a micro LED, which is self-emissive and formed of an inorganic material, as the light emitting element.

Figure 2:
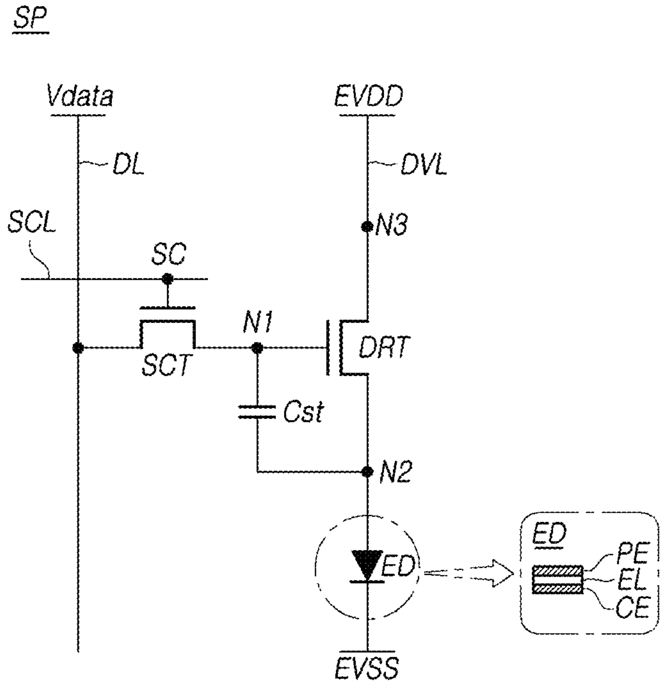
FIGS. 2 and 3 are equivalent circuit diagrams illustrating a subpixel of a display device according to embodiments of the disclosure.
Figure 3:
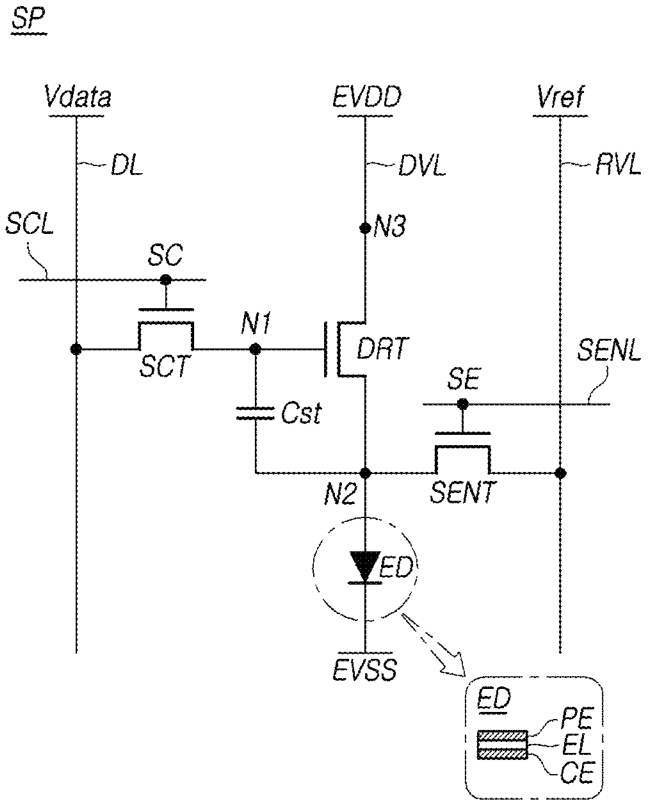

FIGS. 2 and 3 are equivalent circuit diagrams illustrating a subpixel SP of a display device 100 according to embodiments of the disclosure.

Referring to FIG. 2, each of a plurality of subpixels SP disposed on a display panel 110 of a display device 100 according to embodiments of the disclosure may include a light emitting element ED, a driving transistor DRT, a scan transistor SCT, and a storage capacitor Cst.

Referring to FIG. 2, the light emitting element ED may include a pixel electrode PE and a common electrode CE and may include a light emitting layer EL positioned between the pixel electrode PE and the common electrode CE.

The pixel electrode PE of the light emitting element ED may be an electrode disposed in each subpixel SP, and the common electrode CE of the light emitting element ED may be an electrode commonly disposed in all the subpixels SP. Here, the pixel electrode PE may be an anode electrode, and the common electrode CE may be a cathode electrode. Conversely, the pixel electrode PE may be a cathode electrode, and the common electrode CE may be an anode electrode. A base voltage EVSS which is a type of common voltage for display driving may be applied to the common electrode CE of the light emitting element ED.

For example, the light emitting element ED may be an organic light emitting diode (OLED), a light emitting diode (LED), or a quantum dot light emitting element.

The driving transistor DRT is a transistor for driving the light emitting element ED, and may include a first node N1, a second node N2, and a third node N3.

The first node N1 of the driving transistor DRT may be a gate node of the driving transistor DRT, and may be electrically connected with a source node or a drain node of the scan transistor SCT.

The second node N2 of the driving transistor DRT may be a source node or a drain node of the driving transistor DRT, and may be electrically connected with a source node or a drain node of the sensing transistor SENT and may also be electrically connected with the pixel electrode PE of the light emitting element ED.

The third node N3 of the driving transistor DRT may be electrically connected with a driving voltage line DVL supplying a driving voltage EVDD that is another type of common voltage for display driving.

The scan transistor SCT may be controlled by a scan signal SC, which is a type of gate signal, and may be connected between the first node N1 of the driving transistor DRT and the data line DL. In other words, the scan transistor SCT may be turned on or off according to the scan signal SC supplied from the scan signal line SCL, controlling the connection between the data line DL and the first node N1 of the driving transistor DRT. Here, the scan signal line SCL may be one type of gate line GL, and the scan signal SC may be one type of gate signal.

The scan transistor SCT may be turned on by the scan signal SC having a turn-on level voltage and transfer the data voltage Vdata supplied from the data line DL to the first node N1 of the driving transistor DRT.

If the scan transistor SCT is an n-type transistor, the turn-on level voltage of the scan signal SC may be a high level voltage. If the scan transistor SCT is a p-type transistor, the turn-on level voltage of the scan signal SC may be a low level voltage.

The storage capacitor Cst may be electrically connected between the first node N1 and second node N2 of the driving transistor DRT.

The storage capacitor Cst is charged with the quantity of electric charge corresponding to the voltage difference between both ends thereof and serves to maintain the voltage difference between both ends for a predetermined frame time. Accordingly, during the predetermined frame time, the corresponding subpixel SP may emit light.

Referring to FIG. 3, each of the plurality of subpixels SP disposed on the display panel 110 of the display device 100 according to embodiments of the disclosure may further include a sensing transistor SENT.

The sensing transistor SENT may be controlled by a sensing signal SE, which is a type of gate signal, and may be connected between the second node N2 of the driving transistor DRT and the reference voltage line RVL.

In other words, the sensing transistor SENT may be turned on or off according to the sensing signal SE supplied from the sensing signal line SENL, which is another type of the gate line GL, controlling the connection between the reference voltage line RVL and the second node N2 of the driving transistor DRT.

The sensing transistor SENT may be turned on by the sensing signal SE having a turn-on level voltage and transfer a reference voltage Vref supplied from the reference voltage line RVL to the second node N2 of the driving transistor DRT.

The sensing transistor SENT may be turned on by the sensing signal SE having a turn-on level voltage, transferring the voltage of the second node N2 of the driving transistor DRT to the reference voltage line RVL.

If the sensing transistor SENT is an n-type transistor, the turn-on level voltage of the sensing signal SE may be a high level voltage. If the sensing transistor SENT is a p-type transistor, the turn-on level voltage of the sensing signal SE may be a low level voltage.

The function in which the sensing transistor SENT transfers the voltage of the second node N2 of the driving transistor DRT to the reference voltage line RVL may be used upon driving to sense the characteristic value of the subpixel SP. In this case, the voltage transferred to the reference voltage line RVL may be a voltage for calculating the characteristic value of the subpixel SP or a voltage reflecting the characteristic value of the subpixel SP.

In the disclosure, the characteristic value of the subpixel SP may be a characteristic value of the driving transistor DRT or the light emitting element ED. The characteristic value of the driving transistor DRT may include a threshold voltage and mobility of the driving transistor DRT. The characteristic value of the light emitting element ED may include a threshold voltage of the light emitting element ED.

Each of the driving transistor DRT, the scan transistor SCT, and the sensing transistor SENT may be an n-type transistor or a p-type transistor. In the disclosure, for convenience of description, each of the driving transistor DRT, the scan transistor SCT, and the sensing transistor SENT is an n-type transistor.

The storage capacitor Cst is not a parasitic capacitor (e.g., Cgs or Cgd) which is an internal capacitor existing between the gate node and the source node (or drain node) of the driving transistor DRT, but may be an external capacitor intentionally designed outside the driving transistor DRT.

The scan signal line SCL and the sensing signal line SENL may be different gate lines GL. In this case, the scan signal SC and the sensing signal SE may be separate gate signals, and the on-off timings of the scan transistor SCT and the on-off timings of the sensing transistor SENT in one subpixel SP may be independent. In other words, the on-off timings of the scan transistor SCT and the on-off timings of the sensing transistor SENT in one subpixel SP may be the same or different.

Alternatively, the scan signal line SCL and the sensing signal line SENL may be the same gate line GL. In other words, the gate node of the scan transistor SCT and the gate node of the sensing transistor SENT in one subpixel SP may be connected with one gate line GL. In this case, the scan signal SC and the sensing signal SE may be the same gate signals, and the on-off timings of the scan transistor SCT and the on-off timings of the sensing transistor SENT in one subpixel SP may be the same.

The structures of the subpixel SP shown in FIGS. 2 and 3 are merely examples, and various changes may be made thereto, e.g., such as including one or more transistors or one or more capacitors.

Although the subpixel structure is described in connection with FIGS. 2 and 3 under the assumption that the display device 100 is a self-emission display device, if the display device 100 is a liquid crystal display, each subpixel SP may include a transistor and a pixel electrode.

Figure 4:
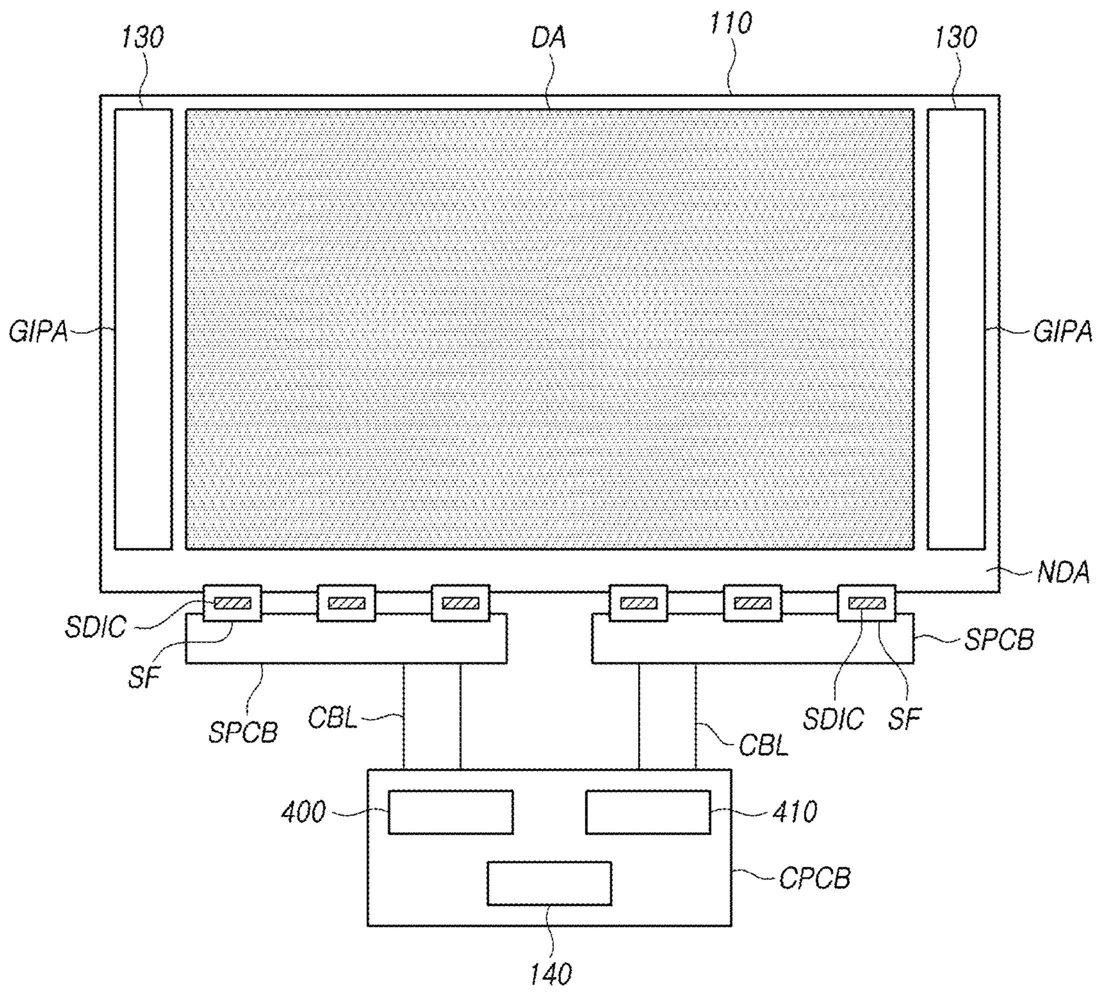
FIG. 4 is a view illustrating an example system configuration of a display device according to embodiments of the disclosure.

FIG. 4 is a view illustrating an example system configuration of a display device 100 according to embodiments of the disclosure.

Referring to FIG. 4, the display panel 110 may include a display area DA in which images are displayed and a non-display area NDA in which no image is displayed.

Referring to FIG. 4, when a data driving circuit 120 includes one or more source driver integrated circuits SDIC and is implemented in a chip-on-film (COF) type, each source driver integrated circuit SDIC may be mounted on a circuit film SF connected to the non-display area NDA of the display panel 110.

Referring to FIG. 4, a gate driving circuit 130 may be implemented in a gate in panel (GIP) type. In this case, the gate driving circuit 130 may be formed in the gate driving circuit area GIPA included in the non-display area NDA of the display panel 110. Unlike FIG. 4, the gate driving circuit 130 may be implemented in a chip on film (COF) type.

The display device 100 may include at least one source printed circuit board SPCB for circuit connection between one or more source driver integrated circuits SDIC and other devices and a control printed circuit board CPCB for mounting control components and various electric devices.

The source driver integrated circuit SDIC-packed film SF may be connected to at least one source printed circuit board SPCB. In other words, one side of the source driver integrated circuit SDIC-packed film SF may be electrically connected with the display panel 110, and the opposite side thereof may be electrically connected with the source printed circuit board SPCB.

A controller 140 and a power management integrated circuit (PMIC) 410 may be mounted on the control printed circuit board CPCB. The controller 140 may perform overall control functions related to driving of the display panel 110, and may control operations of the data driving circuit 120 and the gate driving circuit 130. The power management integrated circuit 410 may supply various voltages or currents to the data driving circuit 120 and the gate driving circuit 130 or may control various voltages or currents to be supplied thereto.

At least one source printed circuit board SPCB and the control printed circuit board CPCB may be circuit-connected through at least one connection cable CBL. Here, the connection cable CBL may be, e.g., a flexible printed circuit (FPC) or a flexible flat cable (FFC).

At least one source printed circuit board SPCB and control printed circuit board CPCB may be integrated into one printed circuit board.

The display device 100 according to embodiments of the disclosure may further include a level shifter 400 for adjusting a voltage level. For example, the level shifter 400 may be disposed on a control printed circuit board CPCB or a source printed circuit board SPCB.

In particular, in the display device 100 according to embodiments of the disclosure, the level shifter 400 may supply signals necessary for gate driving to the gate driving circuit 130. For example, the level shifter 400 may supply a plurality of clock signals to the gate driving circuit 130. Accordingly, the gate driving circuit 130 may generate a plurality of gate signals (e.g., the scan signal SC and the sensing signal SE) based on a plurality of clock signals input from the level shifter 400 and output them to a plurality of gate lines GL (e.g., the scan signal line SCL and the sensing signal line SENL). The plurality of gate lines GL may transfer the plurality of gate signals (e.g., the scan signal SC and the sensing signal SE) to the subpixels SP disposed in the display area DA of the substrate SUB.

Figure 5:
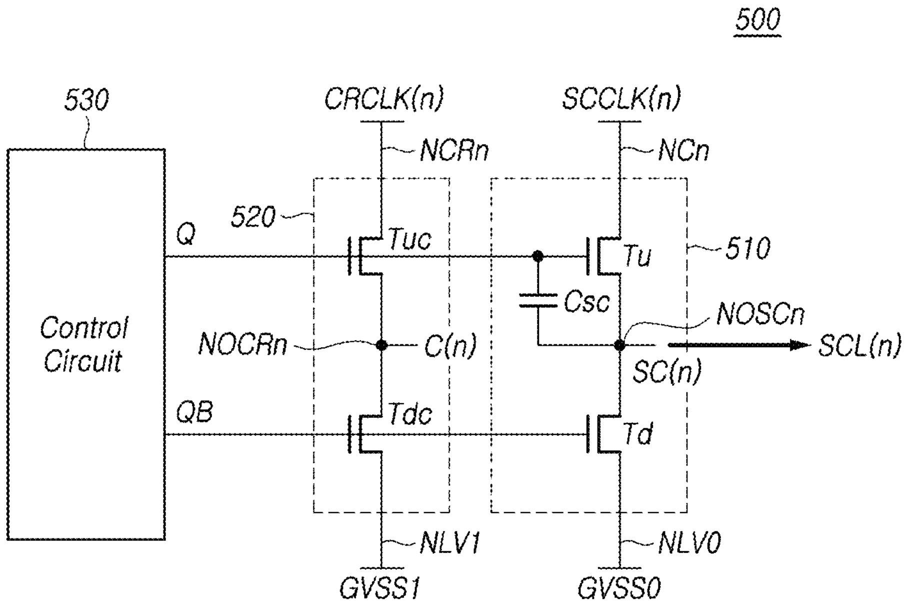
FIG. 5 is a view schematically illustrating a scan driving circuit included in a gate driving circuit according to embodiments of the disclosure.

FIG. 5 is a view schematically illustrating a scan driving circuit 500 included in a gate driving circuit 130 according to embodiments of the disclosure.

Referring to FIG. 5, the gate driving circuit 130 according to embodiments of the disclosure may include a plurality of scan driving circuits 500 configured to output a scan signal SC to each of the plurality of scan signal lines SCL disposed on the display panel 110.

Each of the plurality of scan driving circuits 500 may be connected to one or more scan signal lines SCL. In other words, each of the plurality of scan driving circuits 500 may output the scan signal SC to one or more scan signal lines SCL.

The scan driving circuit 500 illustrated in FIG. 5 is an nth stage circuit for supplying the first scan signal SC(n) to the first scan signal line SCL(n) among the plurality of scan signal lines SCL.

Referring to FIG. 5, each of the plurality of scan driving circuits 500 included in the gate driving circuit 130 may include one or more scan output buffers 510 configured to output one or more scan signals SC and a control circuit 530 configured to control the one or more scan output buffers 510.

Referring to FIG. 5, the scan output buffer 510 may output the first scan signal SC(n) to the scan output node NOSCn electrically connected to the first scan signal line SCL(n) among the plurality of scan signal lines SCL disposed on the display panel 110.

To this end, the scan output buffer 510 may include a scan pull-up transistor Tu connected between the scan clock input node NCn and the scan output node NOSCn and a scan pull-down transistor Td connected between the turn-off level voltage node NLV0 and the scan output node NOSCn.

The scan clock input node NCn may be electrically connected to the drain node or the source node of the scan pull-up transistor Tu. A first scan clock signal SCCLK(n) required to generate the first scan signal SC(n) may be input to the scan clock input node NCn.

The scan output node NOSCn may be electrically connected to the first scan signal line SCL(n). The scan output node NOSCn may be electrically connected to the source node or the drain node of the scan pull-up transistor Tu, and may be electrically connected to the source node or the drain node of the scan pull-down transistor Td.

The turn-off level voltage node NLV0 may be electrically connected to the drain node or the source node of the scan pull-up transistor Tu of the scan pull-down transistor Td.

The turn-off level voltage NLV0 may be input to the turn-off level voltage node NLV0. The turn-off level voltage NLV0 may be a voltage capable of turning off the scan transistor SCT.

Referring to FIG. 5, the scan output buffer 510 may further include a scan capacitor Csc connected between the gate node and the source node (or the drain node) of the scan pull-up transistor Tu.

Referring to FIG. 5, the control circuit 530 may be configured to control a Q node electrically connected to the gate node of the scan pull-up transistor Tu and a QB node electrically connected to the gate node of the scan pull-down transistor Td.

The voltage state of the Q node and the voltage state of the QB node may be opposite. When the Q node is in a high-level voltage state (which may include two or more high-level voltage states), the QB node may be in a low-level voltage state. Conversely, when the Q node is in the low-level voltage state, the QB node may be in the high-level voltage state.

Referring to FIG. 5, the scan output buffer 510 may further include a carry output buffer 520 configured to output the first carry signal C(n) to the carry output node NOCRn.

To this end, the carry output buffer 520 may include a carry pull-up transistor Tuc and a carry pull-down transistor Tdc.

The carry pull-up transistor Tuc may be connected between the carry clock input node NCRn and the carry output node NOCRn.

The carry pull-down transistor Tdc may be connected between the low-potential node NLV1 and the carry output node NOCRn.

The carry clock input node NCRn may be electrically connected to the drain node or the source node of the carry pull-up transistor Tuc. The first carry clock signal CRCLK (n) required to generate the first carry signal C(n) may be input to the carry clock input node NCRn.

The carry output node NOCRn is a node to which the first carry signal C(n) is output, and may be electrically connected to the source node or the drain node of the carry pull-up transistor Tuc, and may be electrically connected to the source node or the drain node of the carry pull-down transistor Tdc.

The low-potential node NLV1 may be electrically connected to the drain node or the source node of the carry pull-down transistor Tdc. A low-potential voltage GVSS1 may be applied to the low-potential node NLV1.

Referring to FIG. 5, the gate node of the carry pull-up transistor Tu may be electrically connected to the gate node of the scan pull-up transistor Tu. Accordingly, the gate node of the carry pull-up transistor Tu, together with the gate node of the scan pull-up transistor Tu, may be electrically connected to the Q node.

Accordingly, the control circuit 530 may simultaneously control the on-off state of the carry pull-up transistor Tu and the on-off state of the scan pull-up transistor Tu.

The gate node of the carry pull-down transistor Tdc may be electrically connected to the gate node of the scan pull-down transistor Td. Accordingly, the gate node of the carry pull-down transistor Tdc, together with the gate node of the scan pull-down transistor Td, may be electrically connected to the QB node.

Accordingly, the control circuit 530 may simultaneously control the on-off state of the carry pull-down transistor Tdc and the on-off state of the scan pull-down transistor Td.

When the gate driving circuit 130 is of a gate in panel (GIP) type, the scan output buffer 510, the carry output buffer 520, and the control circuit 530 included in the scan driving circuit 500 in the gate driving circuit 130 may be circuits embedded in the display panel 110.

Figure 6:
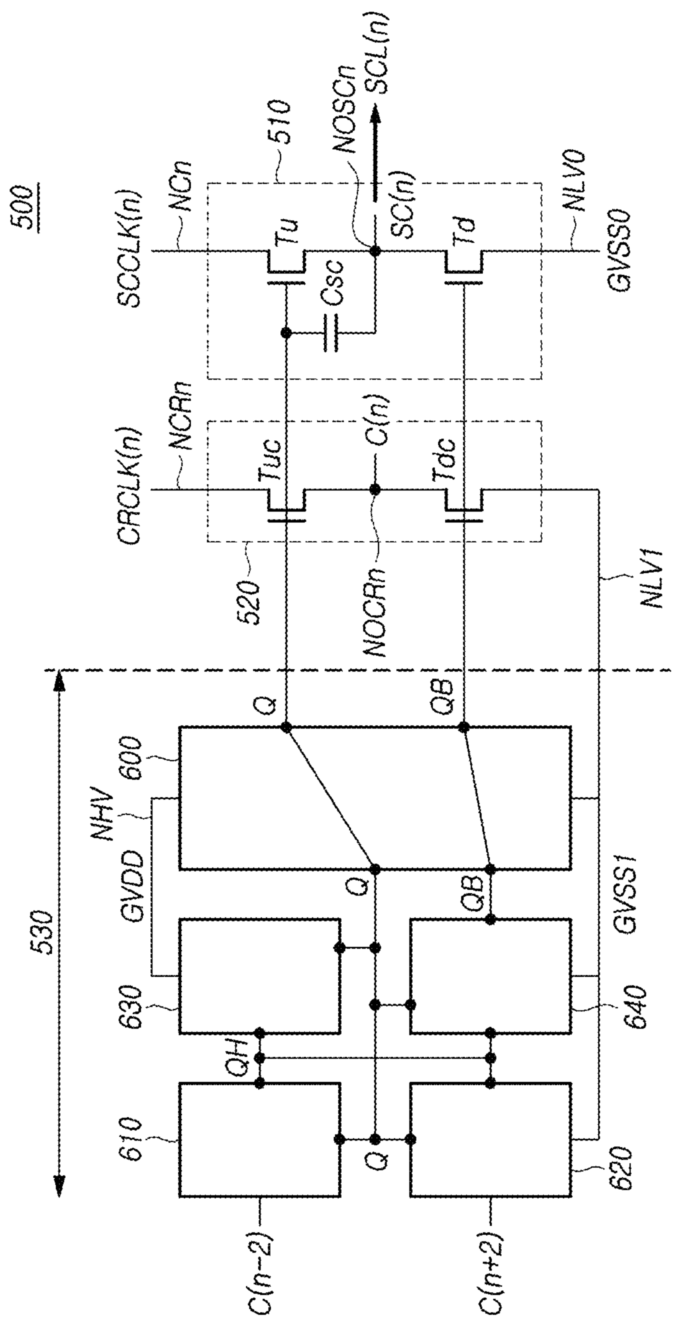
FIG. 6 is a block diagram illustrating a scan driving circuit included in a gate driving circuit according to embodiments of the disclosure.

FIG. 6 is a block diagram of a scan driving circuit 500 included in a gate driving circuit 130 according to embodiments of the disclosure.

Referring to FIG. 6, the scan driving circuit 500 included in the gate driving circuit 130 according to embodiments of the disclosure may include a scan output buffer 510 for outputting a first scan signal SC(n), a carry output buffer 520 for outputting a first carry signal C(n), and a control circuit 530.

Referring to FIG. 6, the control circuit 530 may control the voltage state of the Q node and the voltage state of the QB node to control the scan output buffer 510 and the carry output buffer 520.

Referring to FIG. 6, the control circuit 530 may include a Q node charging circuit 610 configured to charge a Q node, a Q node discharging circuit 620 configured to discharge a Q node, a QH node control circuit 630 configured to control a QH node (holding node), and a Q node stabilization circuit 640 configured to stabilize a voltage of a Q node.

Referring to FIG. 6, the control circuit 530 may further include an inverter circuit 600 for charging or discharging a QB node.

Referring to FIG. 6, the Q node charging circuit 610 may receive the second carry signal C(n−2) output from the scan driving circuit 500 corresponding to the previous stage of the current stage.

Referring to FIG. 6, the Q node discharge circuit 620 may receive the third carry signal C(n+−2) output from the scan driving circuit 500 corresponding to the next stage of the current stage.

Referring to FIG. 6, the QH node control circuit 630 and the inverter circuit 600 may be electrically connected to the high-potential node NHV to receive a high-potential voltage GVDD.

Referring to FIG. 6, the Q node discharge circuit 620, the Q node stabilization circuit 640, and the inverter circuit 600 may be electrically connected to the low-potential node NLV1 to receive the low-potential voltage GVSS1.

Referring to FIG. 6, the Q node may be electrically connected to the Q node charging circuit 610, the Q node discharging circuit 620, the QH node control circuit 630, the Q node stabilization circuit 640, and the inverter circuit 600.

Referring to FIG. 6, the QB node may be electrically connected to the Q node stabilization circuit 640 and the inverter circuit 600.

Referring to FIG. 6, the QH node may be electrically connected to the Q node charging circuit 610, the Q node discharging circuit 620, the QH node control circuit 630, and the Q node stabilization circuit 640.

Hereinafter, the Q node charging circuit 610, the Q node discharging circuit 620, the QH node control circuit 630, the Q node stabilization circuit 640, and the inverter circuit 600 included in the control circuit 530 will be described in more detail with reference to FIG. 7.

Figure 7:
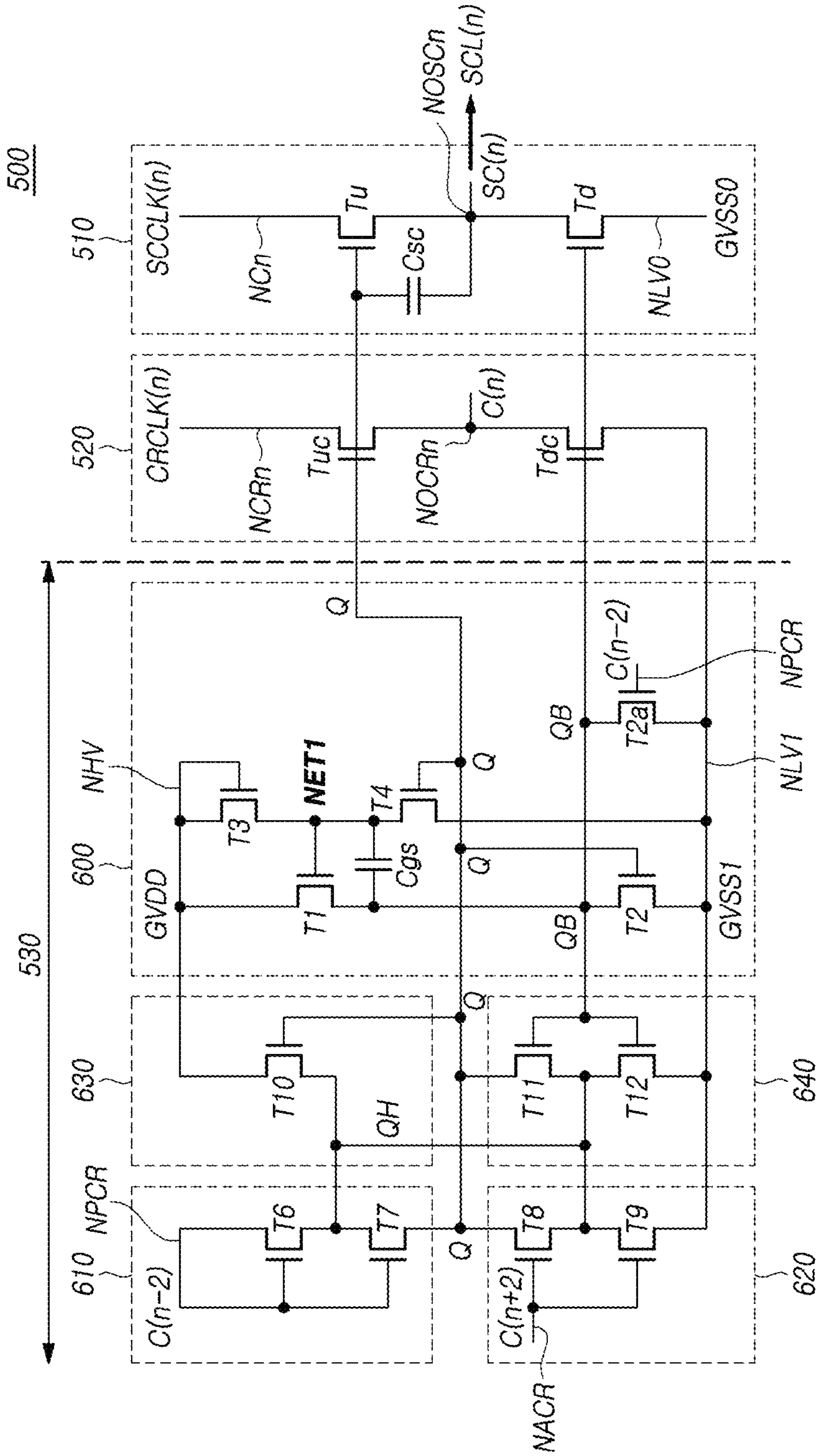
FIG. 7 is a detailed view illustrating a scan driving circuit included in a gate driving circuit according to embodiments of the disclosure.
Figure 8:
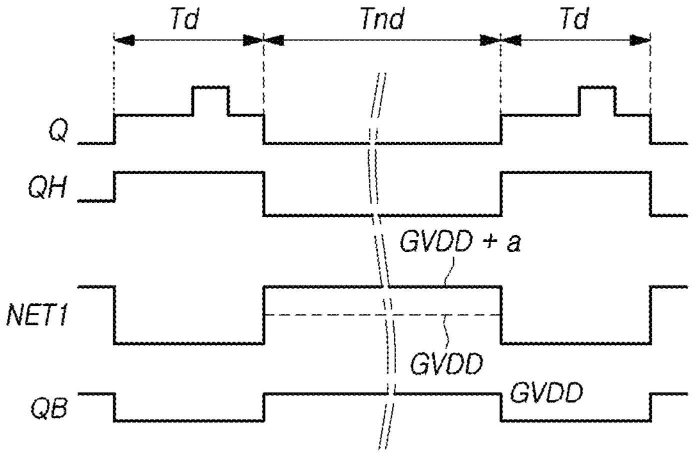
FIG. 8 is an operation timing diagram illustrating a scan driving circuit included in a gate driving circuit according to embodiments of the disclosure.

FIG. 7 is a detailed view of the scan driving circuit 500 included in the gate driving circuit 130 according to embodiments of the disclosure, and FIG. 8 is an operation timing diagram of the scan driving circuit 500 included in the gate driving circuit 130 according to embodiments of the disclosure.

Referring to FIG. 7, the Q node charging circuit 610 may include a sixth transistor T6 for controlling the connection between the QH node and the previous carry signal input node NPCR to which the second carry signal C(n−2) before the first carry signal C(n) is input, and a seventh transistor T7 for controlling the connection between the QH node and the Q node.

A second carry signal C(n−2) before the first carry signal C(n) may be commonly input to the gate node of the sixth transistor T6 and the gate node of the seventh transistor T7.

Referring to FIG. 7, the Q node discharging circuit 620 may include an eighth transistor T8 for controlling a connection between the Q node and the QH node, and a ninth transistor T9 for controlling a connection between the QH node and the low-potential node NLV1.

A third carry signal C(n+2) after the first carry signal C(n) may be commonly input to the gate node of the eighth transistor T8 and the gate node of the ninth transistor T9.

Referring to FIG. 7, the QH node control circuit 630 may include a tenth transistor T10 for controlling a connection between the high-potential node NHV and the QH node.

The gate node of the tenth transistor T10 may be electrically connected to the Q node.

Referring to FIG. 7, the Q node stabilization circuit 640 may include an eleventh transistor T11 for controlling the connection between the Q node and the QH node, and a twelfth transistor T12 for controlling the connection between the QH node and the low-potential node NLV1.

The gate node of the eleventh transistor T11 and the gate node of the twelfth transistor T12 may be electrically connected to the QB node in common.

Referring to FIG. 7, the inverter circuit 600 is a circuit for charging or discharging a QB node, and may include main control nodes including a first control node NET1 and a second control node NET2.

Referring to FIG. 7, the inverter circuit 600 may include a first transistor T1 for controlling the connection between the high-potential node NHV and the QB node, a second transistor T2 for controlling the connection between the QB node and the low-potential node NLV1, a third transistor T3 for controlling the connection between the high-potential node NHV and the first control node NET1, and a fourth transistor T4 for controlling the connection between the first control node NET1 and the low-potential node NLV1.

Referring to FIG. 7, the inverter circuit 600 may include a first inverter circuit unit and a second inverter circuit unit. The first inverter circuit unit may include a third transistor T3 and a fourth transistor T4, and the second inverter circuit unit may include a first transistor T1 and a second transistor T2.

Referring to FIG. 7, the gate node of the first transistor T1 may be electrically connected to the first control node NET1. The gate node of the second transistor T2 may be electrically connected to the Q node. The gate node of the fourth transistor T4 may be electrically connected to the Q node.

Referring to FIG. 7, the inverter circuit 600 may further include an auxiliary transistor T2*a* that is controlled to be turned on and off according to the second carry signal C(n−2) and controls connection between the QB node and the low-potential node NLV1.

Referring to FIG. 7, in the inverter circuit 600, the first transistor T1 may be a transistor for charging the QB node, the second transistor T2 and the auxiliary transistor T2*a* may be transistors for discharging the QB node, and the third and fourth transistors T3 and T4 may be transistors for controlling on/off of the first transistor T1.

Referring to FIG. 7, the second transistor T2 and the fourth transistor T4 may be turned on or off depending on the voltage of the Q node, and the first transistor T1 may be turned on or off depending on the on-off state of the fourth transistor T4.

Referring to FIGS. 7 and 8, in the inverter circuit 600, when the first control node NET1 becomes a voltage (high-level voltage) capable of turning on the first transistor T1, the first transistor T1 may be turned on.

Accordingly, the QB node may be charged by applying the high-potential voltage GVDD to the QB node through the first transistor T1.

Referring to FIGS. 7 and 8, in the inverter circuit 600, when the voltage of the Q node becomes a voltage (a high-level voltage) capable of turning on the second transistor T2, the second transistor T2 may be turned on.

Accordingly, as the low-potential voltage GVSS1 is applied to the QB node through the second transistor T2, the QB node may be discharged.

Referring to FIGS. 7 and 8, in the inverter circuit 600, when the auxiliary transistor T2*a* is turned on by the second carry signal C(n−2), the low-potential voltage GVSS1 may be applied to the QB node through the auxiliary transistor T2*a*. Accordingly, the QB node may be discharged.

Referring to FIGS. 7 and 8, the operation period of the scan driving circuit 500 may include a driving period Td in which the first scan signal line SCL(n) is driven and a non-driving period Tnd in which the first scan signal line SCL(n) is not driven.

Referring to FIGS. 7 and 8, during the driving period Td, the first scan signal SC(n) may have a turn-on level voltage (a high level voltage). To this end, the Q node may have a two-step high-level voltage state, the QB node may have a low-level voltage state, and the QH node may have a high-level voltage state. In other words, during the driving period Td, the Q node may be charged, the QB node may be discharged, and the QH node may be charged.

Referring to FIGS. 7 and 8, during the non-driving period Tnd, the first scan signal SC(n) may have a turn-off level voltage (low level voltage). To this end, the Q node may have a low-level voltage state, the QB node may have a high-level voltage state, and the QH node may have a low-level voltage state. In other words, during the non-driving period, the Q node may be discharged, the QB node may be charged, and the QH node may be discharged.

Referring to FIGS. 7 and 8, during the driving period Td, the second transistor T2 and the fourth transistor T4 may be turned on by the high-level voltage of the Q node.

As the fourth transistor T4 is turned on during the driving period Td, the low-potential voltage GVSS1 may be applied to the first control node NET1 through the fourth transistor T4. As the low-potential voltage GVSS1 is applied to the first control node NET1, the first transistor T1 may be turned off. Accordingly, the connection between the high-potential node NHV and the QB node is disconnected, and the high-potential voltage GVDD is not applied to the QB node.

As the second transistor T2 is turned on during the driving period Td, the low-potential voltage GVSS1 may be applied to the QB node through the second transistor T2.

By using the scan driving circuit 500 included in the gate driving circuit 130 according to the above-described embodiments of the disclosure, the Q node and the QB node may be accurately controlled, and thus an accurate scan driving operation may be performed to help enhance image quality.

Referring to FIGS. 7 and 8, during the non-driving period Tnd, the Q node may have a voltage (low level voltage) capable of turning off the second transistor T2 and the fourth transistor T4, and the QB node may have a high level voltage.

As the fourth transistor T4 is turned off during the non-driving period Tnd, the low-potential voltage GVSS1 may not be applied to the first control node NET1 through the fourth transistor T4, and the first control node NET1 may be in a state in which the high-potential voltage GVDD is applied.

The first transistor T1 may be turned off by the high-potential voltage GVDD applied to the first control node NET1. Accordingly, the high-potential node NHV and the QB node may be connected, and the high-potential voltage GVDD may be applied to the QB node.

During the non-driving period Tnd, the second transistor T2 may be turned off by the low-level voltage of the Q node, and the auxiliary transistor T2*a* may be turned off by the second carry signal C(n−2). Accordingly, the QB node may maintain the high-level voltage state.

Referring to FIG. 7, a parasitic capacitor Cgs may be present between the QB node and the first control node NET1. Here, the parasitic capacitor Cgs may be an internal capacitor present between the gate node and the source node of the first transistor T1.

Voltage coupling may occur between the QB node and the first control node NET1 due to the parasitic capacitors Cgs present between the QB node and the first control node NET1.

During the non-driving period Tnd, the inverter circuit 600 may first apply the high-potential voltage GVDD to the first control node NET1, and then apply the high-potential voltage GVDD to the QB node.

Accordingly, when the high-potential voltage GVDD is applied to the QB node after the high-potential voltage GVDD is applied to the first control node NET1 during the non-driving period Tnd, the voltage of the first control node NET1 may increase from the high-potential voltage GVDD to the first voltage a due to the voltage coupling between the QB node and the first control node NET1 (see FIG. 8). Here, the first voltage a may be a positive voltage value higher than 0 (zero).

Accordingly, during the non-driving period Tnd, the first control node NET1 may have a voltage GVDD+a that is the high-potential voltage GVDD plus the first voltage a, and thus the fourth transistor T4 may maintain a state in which the voltage difference Vds between the drain node and the source node is high (see FIG. 8).

During the non-driving period Tnd, the voltage difference Vds between the drain node and the source node of the fourth transistor T4 may be a difference between the voltage of the first control node NET1 and the low-potential voltage GVSS1.

During the non-driving period Tnd, since the first control node NET1 has the voltage GVDD+a that is resultant by increasing the high-potential voltage GVDD by the first voltage a, the voltage difference Vds between the drain node and the source node of the fourth transistor T4 may be a value GVDD−GVSS1+a obtained by adding the voltage difference GVDD−GVSS1 between the high-potential voltage GVDD and the low-potential voltage GVSS1 and the first voltage a.

For example, when the high-potential voltage GVDD is 24V and the low-potential voltage GVSS1 is −12V, the voltage difference Vds between the drain node and the source node of the fourth transistor T4 may be (36+a) [V].

During the non-driving period Tnd, the low-level voltage of the Q node is applied to the gate node of the fourth transistor T4, so that the fourth transistor T4 needs to be turned off.

However, during the non-driving period Tnd, as the fourth transistor T4, which should be turned off, maintains a state in which the voltage difference Vds between the drain node and the source node is high, an unwanted carrier flow may occur through the channel of the fourth transistor T4, and a leakage current may occur through the fourth transistor T4.

When a leakage current is generated in the fourth transistor T4, a low-potential voltage GVSS1 may be applied to the first control node NET1. Thus, the first transistor T1 is turned off, so that the QB node may not maintain the high-level voltage state. Accordingly, the scan driving circuit 500 may malfunction, causing an image abnormality.

Meanwhile, all or some of all transistors included in the scan driving circuit 500 in the gate driving circuit 130 may be oxide semiconductor transistors.

When the fourth transistor T4 is an oxide semiconductor transistor, a high Vds of the fourth transistor T4 may be more easily generated during the non-driving period Tnd, and thus leakage current may be more easily generated in the fourth transistor T4.

However, even when the fourth transistor T4 is a transistor other than an oxide semiconductor transistor, a high Vds of the fourth transistor T4 may be generated during the non-driving period Tnd, and a leakage current may be generated in the fourth transistor T4.

Described below is a scan driving circuit 500 for preventing a leakage current from occurring in the fourth transistor T4 due to a high Vds of the fourth transistor T4 during the non-driving period Tnd.

Figure 9:
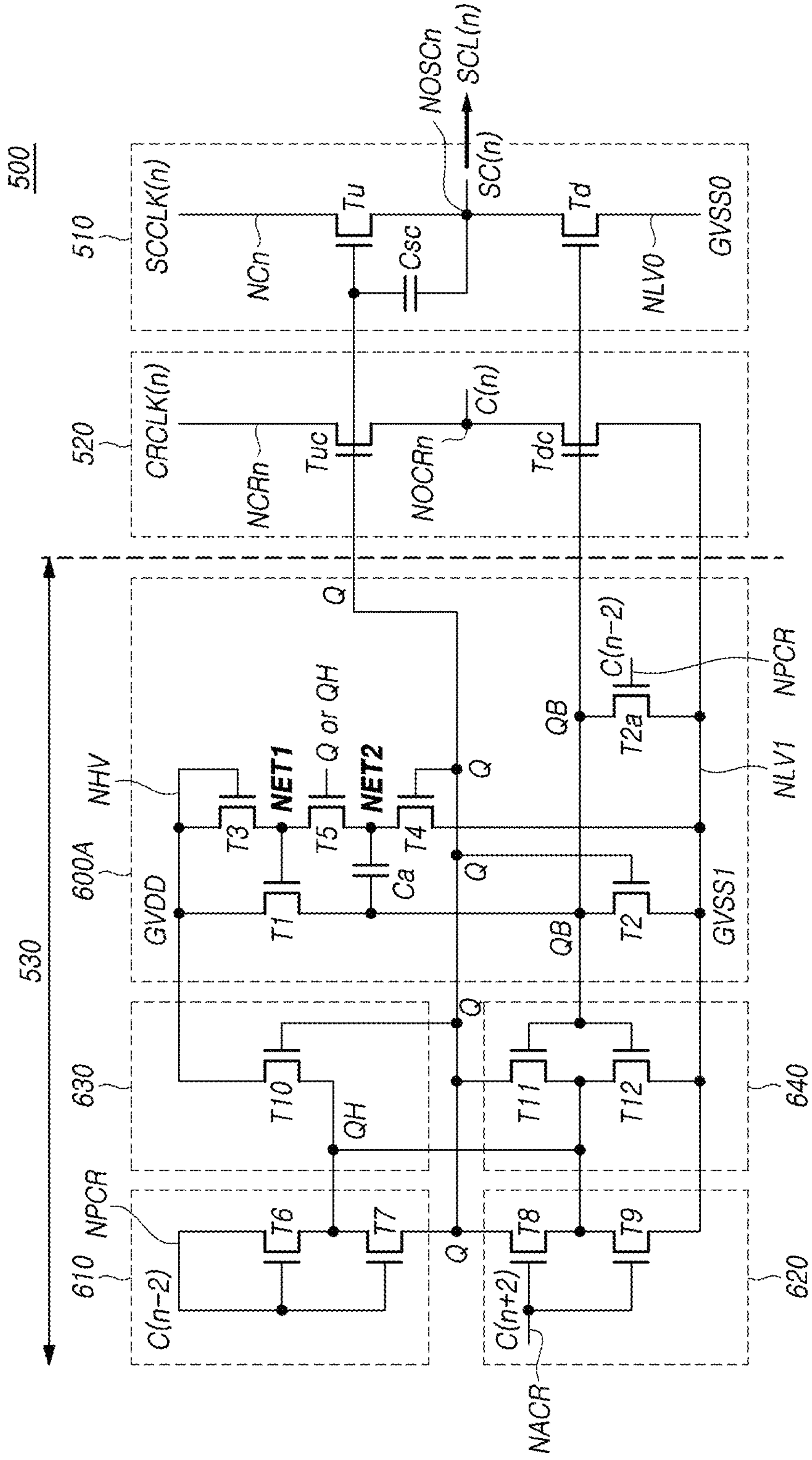
FIG. 9 is another detailed view illustrating a scan driving circuit included in a gate driving circuit according to embodiments of the disclosure.

FIG. 9 is another detailed view of a scan driving circuit 500 included in a gate driving circuit 130 according to embodiments of the disclosure.

The scan driving circuit 500 of FIG. 9 and the scan driving circuit 500 of FIG. 7 have the same configuration except for the inverter circuits 600A and 600. Accordingly, the description of the scan driving circuit 500 of FIG. 9 focuses primarily on the inverter circuit 600A.

Referring to FIG. 9, the control circuit 530 may include a first control node NET1 and a second control node NET2, and may include an inverter circuit 600A for charging or discharging a QB node.

Referring to FIG. 9, the inverter circuit 600A may include a first transistor T1 for controlling the connection between the high-potential node NHV and the QB node, a second transistor T2 for controlling the connection between the QB node and the low-potential node NLV1, a third transistor T3 for controlling the connection between the high-potential node NHV and the first control node NET1, a fourth transistor T4 for controlling the connection between the second control node NET2 and the low-potential node NLV1, and a fifth transistor T5 for controlling the connection between the first control node NET1 and the second control node NET2.

Referring to FIG. 9, in the inverter circuit 600A, the gate node of the first transistor T1 may be electrically connected to the first control node NET1, the gate node of the second transistor T2 may be electrically connected to the Q node, and the gate node of the fourth transistor T4 may be electrically connected to the Q node.

Referring to FIG. 9, in the inverter circuit 600A, the gate node of the third transistor T3 may be electrically connected to the high-potential node NHV.

Referring to FIG. 9, in the inverter circuit 600A, the gate node of the fifth transistor T5 may be electrically connected to a Q node or a node different from the Q node. Here, the node different from the Q node may be a QH node having a similar voltage state to the Q node.

Referring to FIG. 9, the inverter circuit 600A may further include a control capacitor Ca between the QB node and the second control node NET2.

Figure 10:
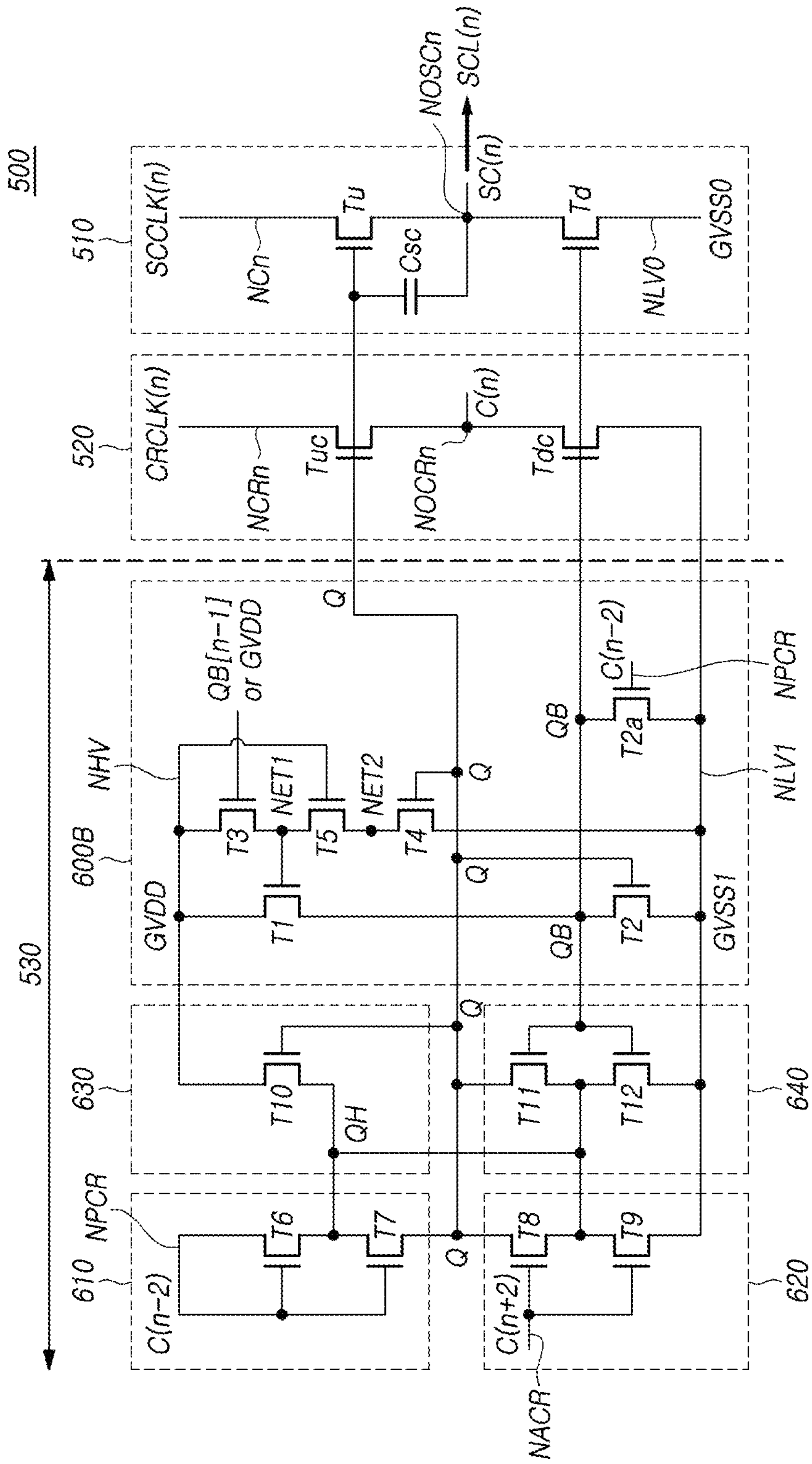
FIG. 10 is another detailed view illustrating a scan driving circuit included in a gate driving circuit according to embodiments of the disclosure.

FIG. 10 is another detailed view of a scan driving circuit 500 included in a gate driving circuit 130 according to embodiments of the disclosure.

The scan driving circuit 500 of FIG. 10 and the scan driving circuit 500 of FIG. 7 have the same configuration except for the inverter circuits 600B and 600. Accordingly, the description of the scan driving circuit 500 of FIG. 10 focuses primarily on the inverter circuit 600B.

Referring to FIG. 10, the control circuit 530 may include a first control node NET1 and a second control node NET2, and may include an inverter circuit 600B for charging or discharging a QB node.

Referring to FIG. 10, an inverter circuit 600B may include a first transistor T1 for controlling the connection between the high-potential node NHV and the QB node, a second transistor T2 for controlling the connection between the QB node and the low-potential node NLV1, a third transistor T3 for controlling the connection between the high-potential node NHV and the first control node NET1, a fourth transistor T4 for controlling the connection between the second control node NET2 and the low-potential node NLV1, and a fifth transistor T5 for controlling the connection between the first control node NET1 and the second control node NET2.

Referring to FIG. 10, in the inverter circuit 600B, the gate node of the first transistor T1 may be electrically connected to the first control node NET1, the gate node of the second transistor T2 may be electrically connected to the Q node, and the gate node of the fourth transistor T4 may be electrically connected to the Q node.

Referring to FIG. 10, in the inverter circuit 600B, the gate node of the fifth transistor T5 may be electrically connected to the high-potential node NHV.

Referring to FIG. 10, in the inverter circuit 600B, the gate node of the third transistor T3 may be electrically connected to the high-potential node NHV or a QB node different from the QB node. Here, if the scan driving circuit 500 of FIG. 10 is the nth stage, the QB node different from the QB node may be the QB node in the scan driving circuit 500 of the (n−1)th stage.

Figure 11:
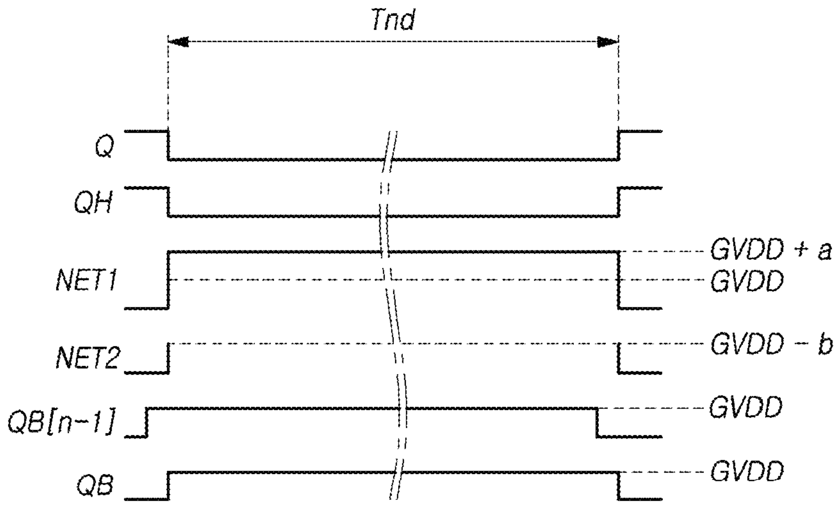
FIG. 11 is an operation timing diagram illustrating the scan driving circuit of FIGS. 9 and 10.

FIG. 11 is an operation timing diagram of the scan driving circuit 500 of FIGS. 9 and 10.

Referring to FIG. 11, during a non-driving period Tnd in which the first scan signal line SCL(n) is not driven by the scan driving circuit 500 of the nth stage, the Q node and the QH node may have a low-level voltage, and the QB node may have a high-level voltage. Here, the high level voltage may be the high-potential voltage GVDD, and the low level voltage may be the low-potential voltage GVSS1.

The non-driving period Tnd during which the first scan signal line SCL(n) is not driven by the scan driving circuit 500 of the nth stage may be a period during which the first scan signal SC(n) output from the scan driving circuit 500 of the nth stage has a turn-off level voltage (low level voltage).

Referring to FIG. 11, during the non-driving period Tnd in which the first scan signal line SCL(n) is not driven, the QB node in the scan driving circuit 500 of the n-th stage may have a high-level voltage period at a timing that is temporally shifted from the high-level voltage period of the QB node QB[n−1] in the scan driving circuit 500 of the (n−1)th stage before the n-th stage.

Referring to FIG. 11, during the non-driving period Tnd in which the first scan signal line SCL(n) is not driven, the first control node NET1 may have a voltage GVDD+a higher than the high-potential voltage GVDD applied to the high-potential node NHV by the first voltage a.

Referring to FIG. 11, during the non-driving period Tnd in which the first scan signal line SCL(n) is not driven, the second control node NET2 may have a positive voltage GVDD−b lower than the high-potential voltage GVDD by the second voltage b. Here, the second voltage b may be a positive voltage value higher than 0 (zero).

Referring to FIG. 11, during the non-driving period Tnd during which the first scan signal line SCL(n) is not driven, the voltage difference Vds between the drain node and the source node of the fourth transistor T4 may be smaller than the voltage difference GVDD−GVSS1 between the high-potential voltage GVDD and the low-potential voltage GVSS1 applied to the low-potential node NLV1 by the second voltage b. Here, the second voltage b may be a voltage difference between the first control node NET1 and the second control node NET2.

Figure 12:
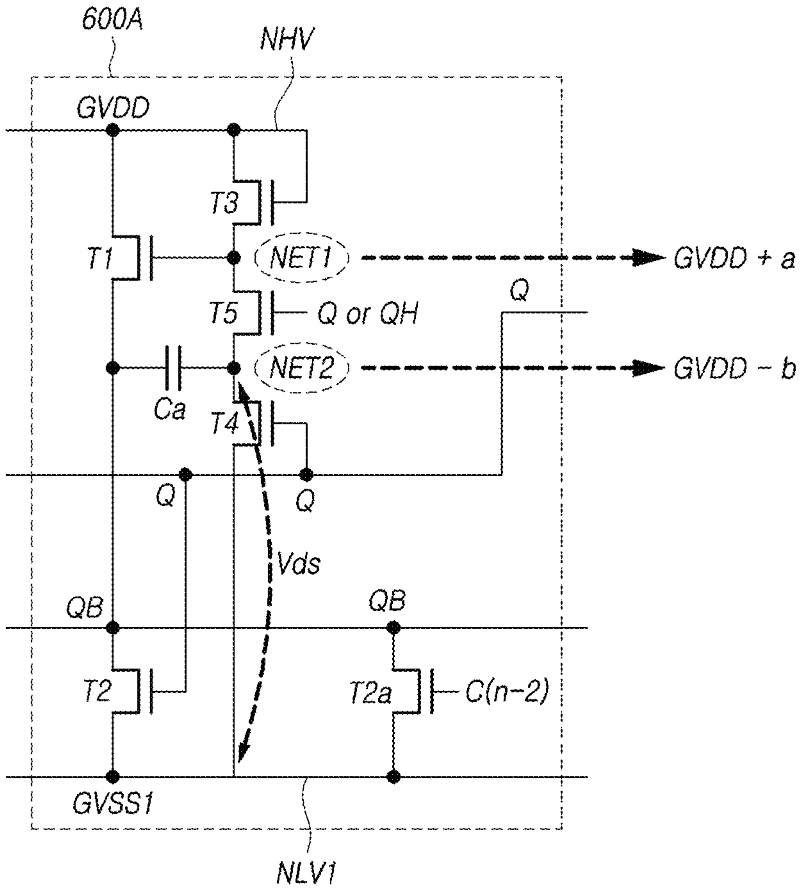
FIG. 12 illustrates an operating state of an inverter circuit included in the scan driving circuit of FIG. 9 during a non-driving period.
Figure 13:
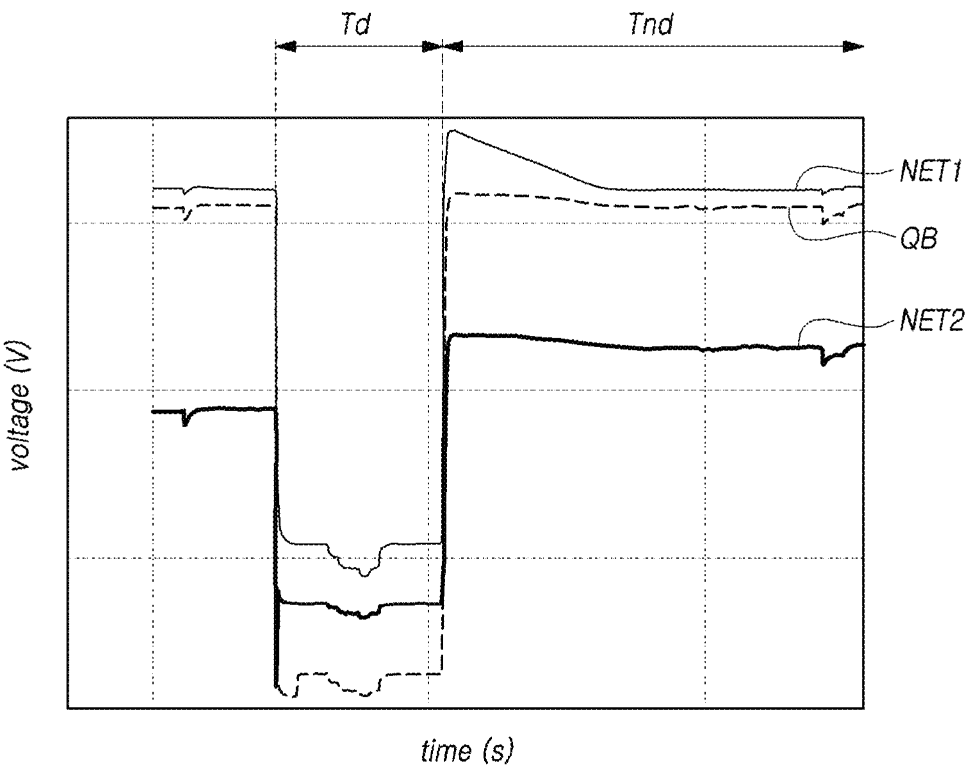
FIG. 13 illustrates voltage states of main nodes in the scan driving circuit of FIG. 9.

FIG. 12 illustrates an operating state of an inverter circuit 600A included in the scan driving circuit 500 of FIG. 9 during a non-driving period Tnd, and FIG. 13 is a simulation graph illustrating voltage states of main nodes NET1, NET2, and QB in the scan driving circuit 500 of FIG. 9.

Referring to FIG. 12, a parasitic capacitor Cgs may be present between the QB node and the first control node NET1. Here, the parasitic capacitor Cgs may be an internal capacitor present between the gate node and the source node of the first transistor T1.

Referring to FIG. 12, voltage coupling may occur between the QB node and the first control node NET1 due to the parasitic capacitor Cgs present between the QB node and the first control node NET1.

Referring to FIGS. 12 and 13, during the non-driving period Tnd, in the inverter circuit 600A, the high-potential voltage GVDD may be first applied to the first control node NET1, and then the high-potential voltage GVDD may be applied to the QB node.

Referring to FIGS. 12 and 13, when the high-potential voltage GVDD is applied to the QB node after the high-potential voltage GVDD is applied to the first control node NET1 during the non-driving period Tnd, the voltage of the first control node NET1 may be the voltage GVDD+a which has been increased from the high-potential voltage GVDD by the first voltage a due to voltage coupling between the QB node and the first control node NET1. Here, the first voltage a may be a positive voltage value higher than 0 (zero).

Referring to FIGS. 12 and 13, a control capacitor Ca is connected between the second control node NET2 and the QB node. In other words, the second control node NET2 and the QB node are coupled in a capacitive manner.

Referring to FIGS. 12 and 13, during the non-driving period Tnd, the second control node NET2 may have a voltage GVDD−b decreased from the high-potential voltage GVDD by the second voltage b.

Referring to FIGS. 12 and 13, during the non-driving period Tnd, the voltage difference Vds between the drain node and the source node of the fourth transistor T4 may be a difference between the voltage of the second control node NET2 and the low-potential voltage GVSS1.

During the non-driving period Tnd, the voltage of the second control node NET2 may be a voltage NET1-*b* decreased by the second voltage b from the voltage of the first control node NET1 by the fifth transistor T5.

Accordingly, referring to FIGS. 12 and 13, during the non-driving period Tnd, the voltage difference Vds between the drain node and the source node of the fourth transistor T4 may be a value (GVDD−GVSS1)−b obtained by subtracting the second voltage b from the voltage difference (GVDD−GVSS1) between the high-potential voltage GVDD and the low-potential voltage GVSS1 (Vds=(voltage of NET2)−GVSS1=(GVDD−b)−GVSS1=(GVDD−GVSS1)−b).

Referring to FIGS. 12 and 13, during the non-driving period Tnd, the voltage difference Vds=GVDD−GVSS1-*b* between the drain node and the source node of the fourth transistor T4 in the scan driving circuit 500 of FIG. 9 is lower than the voltage difference Vds=GVDD−GVSS1+a between the drain node and the source node of the fourth transistor T4 in the scan driving circuit 500 of FIG. 7.

For example, when the high-potential voltage GVDD is 24V and the low-potential voltage GVSS1 is −12V, the voltage difference Vds between the drain node and the source node of the fourth transistor T4 may be (36−b)[V].

Referring to FIG. 13, during the non-driving period Tnd, the voltage GVDD+a of the first control node NET1 may be higher than the voltage GVDD of the QB node by the first voltage a, and the voltage GVDD−b of the second control node NET2 may be lower than the voltage GVDD of the QB node by the second voltage b. In other words, during the non-driving period Tnd, the QB node may have a voltage between the voltage of the first control node NET1 and the voltage of the second control node NET2.

Figure 14:
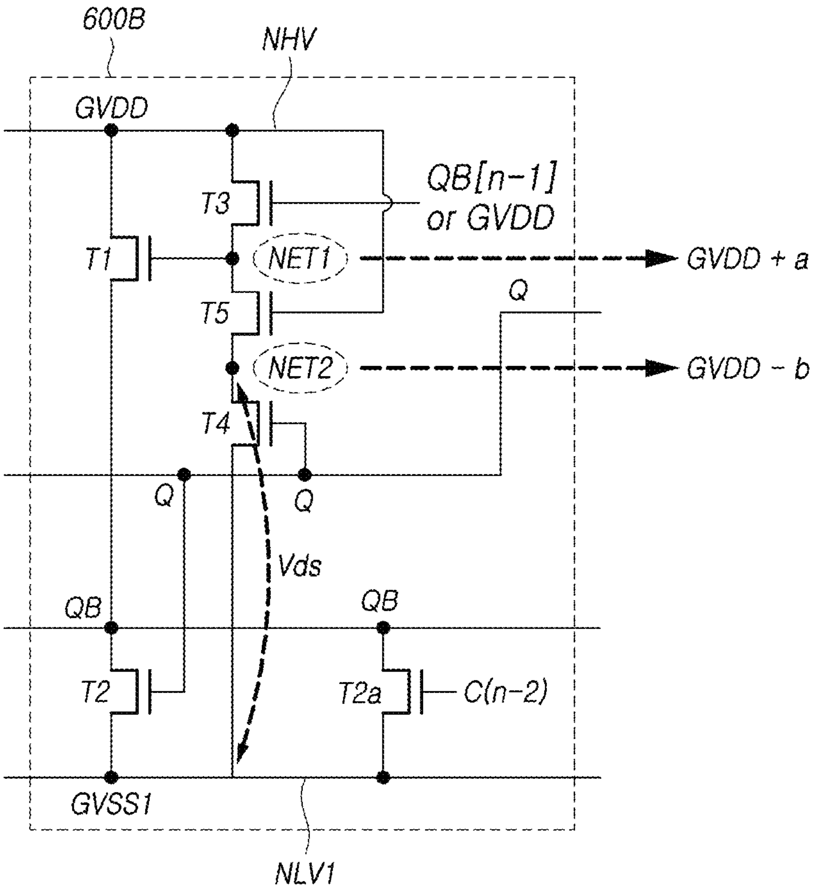
FIG. 14 illustrates an operating state of an inverter circuit included in the scan driving circuit of FIG. 10 during a non-driving period.
Figure 15:
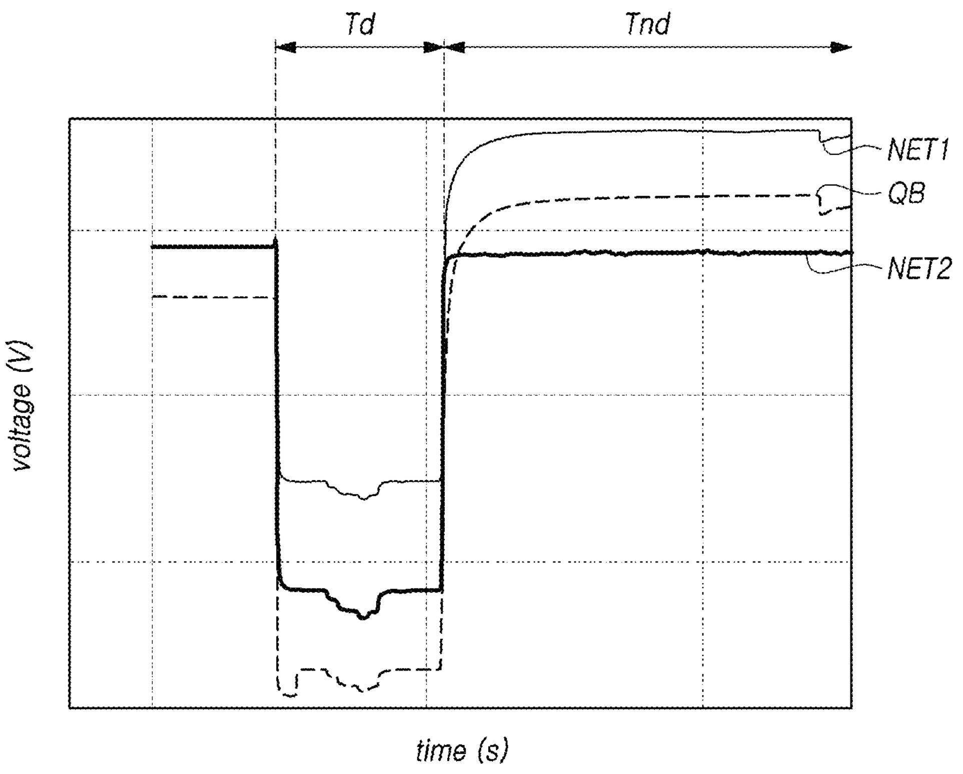
FIG. 15 illustrates voltage states of main nodes in the scan driving circuit of FIG. 10.

FIG. 14 illustrates an operating state of an inverter circuit 600B included in the scan driving circuit 500 of FIG. 10 during a non-driving period Tnd, and FIG. 15 is a simulation graph illustrating voltage states of main nodes NET1, NET2, and QB in the scan driving circuit 500 of FIG. 10.

Referring to FIG. 14, a parasitic capacitor Cgs may be present between the QB node and the first control node NET1. Here, the parasitic capacitor Cgs may be an internal capacitor present between the gate node and the source node of the first transistor T1.

Referring to FIG. 14, voltage coupling may occur between the QB node and the first control node NET1 due to the parasitic capacitor Cgs present between the QB node and the first control node NET1.

Referring to FIGS. 14 and 15, during the non-driving period Tnd, in the inverter circuit 600B, the high-potential voltage GVDD may be first applied to the first control node NET1, and then the high-potential voltage GVDD may be applied to the QB node.

Referring to FIGS. 14 and 15, when the high-potential voltage GVDD is applied to the QB node after the high-potential voltage GVDD is applied to the first control node NET1 during the non-driving period Tnd, the voltage of the first control node NET1 may be the voltage GVDD+a increased from the high-potential voltage GVDD by the first voltage a by voltage coupling between the QB node and the first control node NET1. Here, the first voltage a may be a positive voltage value higher than 0 (zero).

Referring to FIGS. 14 and 15, during the non-driving period Tnd, the second control node NET2 may have a voltage GVDD−b decreased from the high-potential voltage GVDD by the second voltage b.

Referring to FIGS. 14 and 15, during the non-driving period Tnd, the voltage difference Vds between the drain node and the source node of the fourth transistor T4 may be a difference between the voltage of the second control node NET2 and the low-potential voltage GVSS1.

During the non-driving period Tnd, the voltage of the second control node NET2 may be a voltage NET1-*b* decreased by the second voltage b from the voltage of the first control node NET1 by the fifth transistor T5.

Accordingly, referring to FIGS. 14 and 15, during the non-driving period Tnd, the voltage difference Vds between the drain node and the source node of the fourth transistor T4 may be a value (GVDD−GVSS1)−b obtained by subtracting the second voltage b from the voltage difference (GVDD−GVSS1) between the high-potential voltage GVDD and the low-potential voltage GVSS1 (Vds=(the voltage of NET2)−GVSS1=(GVDD−b)−GVSS1=(GVDD−GVSS1)−b).

Referring to FIGS. 14 and 15, during the non-driving period Tnd, the voltage difference Vds=GVDD−GVSS1-*b* between the drain node and the source node of the fourth transistor T4 in the scan driving circuit 500 of FIG. 9 is lower than the voltage difference Vds=GVDD−GVSS1+a between the drain node and the source node of the fourth transistor T4 in the scan driving circuit 500 of FIG. 7.

For example, when the high-potential voltage GVDD is 24V and the low-potential voltage GVSS1 is −12V, the voltage difference Vds between the drain node and the source node of the fourth transistor T4 may be (36−b) [V].

Referring to FIG. 15, during the non-driving period Tnd, the voltage GVDD+a of the first control node NET1 may be higher than the voltage GVDD of the QB node by the first voltage a, and the voltage GVDD−b of the second control node NET2 may be lower than the voltage GVDD of the QB node by the second voltage b. In other words, during the non-driving period Tnd, the QB node may have a voltage between the voltage of the first control node NET1 and the voltage of the second control node NET2.

In the inverter circuit 600B of FIG. 14, the first voltage a may be the same as or different from the first voltage a in the inverter circuit 600A of FIG. 12.

In the inverter circuit 600B of FIG. 14, the second voltage b may be the same as or different from the second voltage b in the inverter circuit 600A of FIG. 12.

The inverter circuit 600B of FIG. 14 does not include the control capacitor Ca that is included in the inverter circuit 600A of FIG. 12.

In the inverter circuit 600B of FIG. 14, the second voltage b may be lower than the second voltage b in the inverter circuit 600A of FIG. 12. Accordingly, during the non-driving period Tnd, the voltage of the second control node NET2 in the inverter circuit 600B of FIG. 14 may be higher than the voltage of the second control node NET2 in the inverter circuit 600A of FIG. 12.

The foregoing embodiments are briefly described below.

A gate driving circuit may comprise a scan output buffer outputting a first scan signal to a scan output node electrically connected to a first scan signal line among a plurality of scan signal lines disposed on a display panel and including a scan pull-up transistor connected between a scan clock input node and a scan output node and a scan pull-down transistor connected between a turn-off level voltage node and the scan output node and a control circuit configured to control a Q node electrically connected to a gate node of the scan pull-up transistor and a QB node electrically connected to a gate node of the scan pull-down transistor.

The control circuit may include a first control node and a second control node and includes an inverter circuit for charging or discharging a QB node.

The inverter circuit may include a first transistor controlling a connection between a high-potential node and the QB node, a second transistor controlling a connection between the QB node and a low-potential node, a third transistor controlling a connection between the high-potential node and the first control node, a fourth transistor controlling a connection between the second control node and the low-potential node, and a fifth transistor controlling a connection between the first control node and the second control node.

In the inverter circuit, a gate node of the first transistor may be electrically connected to the first control node, a gate node of the second transistor may be electrically connected to a Q node, and a gate node of the fourth transistor is electrically connected to the Q node.

In the inverter circuit, a gate node of the third transistor may be electrically connected to the high-potential node, and a gate node of the fifth transistor may be electrically connected to the Q node or a node different from the Q node.

In this case, the inverter circuit may further include a control capacitor between the QB node and the second control node.

In the inverter circuit, a gate node of the fifth transistor may be electrically connected to the high-potential node, and a gate node of the third transistor may be electrically connected to a node different from the QB node or the high-potential node.

During a non-driving period when the first scan signal line is not driven, the first control node in the inverter circuit may have a voltage higher than a high-potential voltage applied to the high-potential node.

During the non-driving period, the second control node in the inverter circuit may have a voltage lower than the high-potential voltage.

During the non-driving period, a voltage difference between a drain node and a source node of the fourth transistor in the inverter circuit may be smaller than a voltage difference between the high-potential voltage and a low-potential voltage applied to the low-potential node.

During a non-driving period when the first scan signal line is not driven, the QB node may have a voltage between a voltage of the first control node and a voltage of the second control node.

The gate driving circuit according to embodiments of the disclosure may further comprise a carry output buffer including a carry pull-up transistor outputting a first carry signal to a carry output node and connected between a carry clock input node and the carry output node and a carry pull-down transistor connected between a low-potential node and the carry output node, a Q node charging circuit including a sixth transistor controlling a connection between a QH node and a previous carry signal input node receiving a second carry signal preceding the first carry signal and a seventh transistor controlling a connection between the QH node and the Q node, and a Q node discharging circuit including an eighth transistor controlling a connection between the Q node and the QH node and a ninth transistor controlling a connection between the QH node and the low-potential node.

The second carry signal preceding the first carry signal may be commonly input to a gate node of the sixth transistor and a gate node of the seventh transistor.

A third carry signal following the first carry signal may be commonly input to a gate node of the eighth transistor and a gate node of the ninth transistor.

The gate driving circuit according to embodiments of the disclosure may further comprise a QH node control circuit including a tenth transistor controlling a connection between the high-potential node and the QH node and a Q node stabilization circuit including an eleventh transistor controlling a connection between the Q node and the QH node and a twelfth transistor controlling a connection between the QH node and the low-potential node.

A gate node of the tenth transistor may be electrically connected to the Q node, and a gate node of the eleventh transistor and a gate node of the twelfth transistor are commonly electrically connected to the QB node.

The inverter circuit further may include an auxiliary transistor that is controlled to be turned on or off depending on the second carry signal and controlling a connection between the QB node and the low-potential node.

The fourth transistor may be an oxide semiconductor transistor.

A display panel according to embodiments may comprise a plurality of scan signal lines and a gate driving circuit outputting a scan signal to each of the plurality of scan signal lines.

The gate driving circuit may comprise a scan output buffer outputting a first scan signal to a scan output node electrically connected to a first scan signal line among the plurality of scan signal lines and including a scan pull-up transistor connected between a scan clock input node and a scan output node and a scan pull-down transistor connected between a turn-off level voltage node and the scan output node and a control circuit configured to control a Q node electrically connected to a gate node of the scan pull-up transistor and a QB node electrically connected to a gate node of the scan pull-down transistor.

The control circuit may include a first control node and a second control node and includes an inverter circuit for charging or discharging a QB node.

The inverter circuit may include a first transistor controlling a connection between a high-potential node and the QB node, a second transistor controlling a connection between the QB node and a low-potential node, a third transistor controlling a connection between the high-potential node and the first control node, a fourth transistor controlling a connection between the second control node and the low-potential node, and a fifth transistor controlling a connection between the first control node and the second control node.

In the inverter circuit, the gate node of the first transistor may be electrically connected to the first control node. A gate node of the second transistor may be electrically connected to a Q node. A gate node of the fourth transistor may be electrically connected to the Q node.

In the inverter circuit, a gate node of the third transistor may be electrically connected to the high-potential node. A gate node of the fifth transistor may be electrically connected to the Q node or a node different from the Q node.

The inverter circuit may further include a control capacitor between the QB node and the second control node.

In the inverter circuit, a gate node of the fifth transistor may be electrically connected to the high-potential node, and a gate node of the third transistor may be electrically connected to a node different from the QB node or the high-potential node.

During a non-driving period when the first scan signal line is not driven, the first control node may have a voltage higher than a high-potential voltage applied to the high-potential node.

During the non-driving period when the first scan signal line is not driven, the second control node may have a voltage lower than the high-potential voltage.

During the non-driving period when the first scan signal line is not driven, a voltage difference between a drain node and a source node of the fourth transistor may be smaller than a voltage difference between the high-potential voltage and the low-potential voltage.

During a non-driving period when the first scan signal line is not driven, the QB node may have a voltage between a voltage of the first control node and a voltage of the second control node.

A gate driving circuit according to embodiments of the disclosure may comprise a scan output buffer outputting a first scan signal to a scan output node electrically connected to a first scan signal line among a plurality of scan signal lines disposed on a display panel, and including a scan pull-up transistor and a scan pull-down transistor and a control circuit configured to control the scan output buffer.

In the gate driving circuit according to embodiments of the disclosure, the control circuit may include a first control node and a second control node and includes an inverter circuit for charging or discharging a QB node.

In the gate driving circuit according to embodiments of the disclosure, the inverter circuit may include a first transistor for charging the QB node and two or more transistors connected between a gate node of the first transistor and a low-potential node to which a low-potential voltage is applied.

In the gate driving circuit according to embodiments of the disclosure, the inverter circuit may include a first transistor controlling a connection between a high-potential node and the QB node, a second transistor controlling a connection between the QB node and a low-potential node, a third transistor controlling a connection between the high-potential node and the first control node, a fourth transistor controlling a connection between the second control node and the low-potential node, and a fifth transistor controlling a connection between the first control node and the second control node.

The two or more transistors connected between the gate node of the first transistor and the low-potential node may include a fourth transistor and a fifth transistor.

According to embodiments of the disclosure described above, there may be provided a gate driving circuit including an inverter circuit having a circuit structure capable of preventing malfunctions without causing a circuit problem during a non-driving period when the scan signal lines are not driven and a display panel including an embedded gate driving circuit.

According to embodiments of the disclosure, there may be provided a gate driving circuit capable of preventing unwanted leakage current in the transistor involving on-off control of a QB node charging transistor and a display panel including an embedded gate driving circuit.

It will be apparent to those skilled in the art that various modifications and variations can be made in the gate driving circuit and the display device of the present disclosure without departing from the technical idea or scope of the disclosure. Thus, it is intended that the present disclosure cover the modifications and variations of this disclosure provided they come within the scope of the appended claims and their equivalents.

What is claimed:

1. A gate driving circuit, comprising:
a scan output buffer configured to output a first scan signal to a scan output node electrically connected to a first scan signal line among a plurality of scan signal lines disposed on a display panel, and including a scan pull-up transistor and a scan pull-down transistor; and
a control circuit configured to control the scan output buffer, wherein the control circuit includes a first control node and a second control node and includes an inverter circuit configured to charge or discharge a QB node,
wherein the inverter circuit includes:
a first transistor configured to control a connection between a high-potential node and the QB node;
a second transistor configured to control a connection between the QB node and a low-potential node;
a third transistor configured to control a connection between the high-potential node and the first control node;
a fourth transistor configured to control a connection between the second control node and the low-potential node; and
a fifth transistor configured to control a connection between the first control node and the second control node,
wherein a gate node of the first transistor is electrically connected to the first control node, a gate node of the second transistor is electrically connected to a Q node, and a gate node of the fourth transistor is electrically connected to the Q node, and
wherein a first electrode of the fifth transistor is physically and electrically connected to the first control node and the gate node of the first transistor, a second electrode of the fifth transistor is physically and electrically connected to a first electrode of the fourth transistor, and a second electrode of the fourth transistor is directly connected to the low-potential node directly connected to any one of first and second electrodes of the second transistor.

2. The gate driving circuit of claim 1, wherein a gate node of the third transistor is electrically connected to the high-potential node, and wherein a gate node of the fifth transistor is electrically connected to the Q node or a node different from the Q node.

3. The gate driving circuit of claim 1, wherein the inverter circuit further includes a control capacitor between the QB node and the second control node.

4. The gate driving circuit of claim 1, wherein a gate node of the fifth transistor is electrically connected to the high-potential node, and wherein a gate node of the third transistor is electrically connected to a node different from the QB node or the high-potential node.

5. The gate driving circuit of claim 1, wherein during a non-driving period when the first scan signal line is not driven, the QB node has a voltage between a voltage of the first control node and a voltage of the second control node.

6. The gate driving circuit of claim 1, wherein the fourth transistor is an oxide semiconductor transistor.

7. The gate driving circuit of claim 1, wherein during a non-driving period when the first scan signal line is not driven, the first control node has a voltage higher than a high-potential voltage applied to the high-potential node.

8. The gate driving circuit of claim 7, wherein during the non-driving period, the second control node has a voltage lower than the high-potential voltage.

9. The gate driving circuit of claim 8, wherein during the non-driving period, a voltage difference between a drain node and a source node of the fourth transistor is smaller than a voltage difference between the high-potential voltage and a low-potential voltage applied to the low-potential node.

10. The gate driving circuit of claim 1, further comprising:
a carry output buffer including a carry pull-up transistor configured to output a first carry signal to a carry output node and connected between a carry clock input node and the carry output node and a carry pull-down transistor connected between the low-potential node and the carry output node;
a Q node charging circuit including a sixth transistor configured to control a connection between a QH node and a previous carry signal input node receiving a second carry signal preceding the first carry signal and a seventh transistor configured to control a connection between the QH node and the Q node; and
a Q node discharging circuit including an eighth transistor configured to control a connection between the Q node and the QH node and a ninth transistor configured to control a connection between the QH node and the low-potential node,
wherein the second carry signal preceding the first carry signal is commonly input to a gate node of the sixth transistor and a gate node of the seventh transistor, and a third carry signal following the first carry signal is commonly input to a gate node of the eighth transistor and a gate node of the ninth transistor.

11. The gate driving circuit of claim 10, further comprising:
a QH node control circuit including a tenth transistor configured to control a connection between the high-potential node and the QH node; and
a Q node stabilization circuit including an eleventh transistor configured to control a connection between the Q node and the QH node and a twelfth transistor configured to control a connection between the QH node and the low-potential node,
wherein a gate node of the tenth transistor is electrically connected to the Q node, and a gate node of the eleventh transistor and a gate node of the twelfth transistor are commonly electrically connected to the QB node.

12. The gate driving circuit of claim 10, wherein the inverter circuit further includes an auxiliary transistor that is controlled to be turned on or off depending on the second carry signal and controlling a connection between the QB node and the low-potential node.

13. A display panel, comprising:
a plurality of scan signal lines; and
a gate driving circuit configured to output a scan signal to each of the plurality of scan signal lines,
wherein the gate driving circuit includes:
a scan output buffer configured to output a first scan signal to a scan output node electrically connected to a first scan signal line among the plurality of scan signal lines, and including a scan pull-up transistor and a scan pull-down transistor; and
a control circuit configured to control the scan output buffer, wherein the control circuit includes a first control node and a second control node and includes an inverter circuit configured to charge or discharge a QB node, wherein the inverter circuit includes:

a first transistor configured to control a connection between a high-potential node and the QB node;

a second transistor configured to control a connection between the QB node and a low-potential node;

a third transistor configured to control a connection between the high-potential node and the first control node;

a fourth transistor configured to control a connection between the second control node and the low-potential node; and a fifth transistor configured to control a connection between the first control node and the second control node, wherein a gate node of the first transistor is electrically connected to the first control node, a gate node of the second transistor is electrically connected to a Q node, and a gate node of the fourth transistor is electrically connected to the Q node, and wherein a first electrode of the fifth transistor is physically and electrically connected to the first control node and the gate node of the first transistor, a second electrode of the fifth transistor is physically and electrically connected to a first electrode of the fourth transistor, and a second electrode of the fourth transistor is directly connected to the low-potential node directly connected to any one of first and second electrodes of the second transistor.

14. The display panel of claim 13, wherein a gate node of the third transistor is electrically connected to the high-potential node, and a gate node of the fifth transistor is electrically connected to the Q node or a node different from the Q node.

15. The display panel of claim 13, wherein the inverter circuit further includes a control capacitor between the QB node and the second control node.

16. The display panel of claim 13, wherein a gate node of the fifth transistor is electrically connected to the high-potential node, and a gate node of the third transistor is electrically connected to a QB node different from the QB node or the high-potential node.

17. The display panel of claim 13, wherein during a non-driving period when the first scan signal line is not driven, the first control node has a voltage higher than a high-potential voltage applied to the high-potential node.

18. The display panel of claim 17, wherein during the non-driving period when the first scan signal line is not driven, the second control node has a voltage lower than the high-potential voltage.

19. The display panel of claim 18, wherein during the non-driving period when the first scan signal line is not driven, a voltage difference between a drain node and a source node of the fourth transistor is smaller than a voltage difference between the high-potential voltage and a low-potential voltage.

20. A gate driving circuit, comprising:

a scan output buffer configured to output a first scan signal to a scan output node electrically connected to a first scan signal line among a plurality of scan signal lines disposed on a display panel, and including a scan pull-up transistor and a scan pull-down transistor; and a control circuit configured to control the scan output buffer, wherein the control circuit includes a first control node and a second control node, and includes an inverter circuit for charging or discharging a QB node, wherein the inverter circuit includes a first transistor configured to charge the QB node and two or more transistors connected between a gate node of the first transistor and a low-potential node to which a low-potential voltage is applied, wherein the two or more transistors include:

a second transistor configured to control a connection between the QB node and the low-potential node;

a third transistor configured to control a connection between a high-potential node and the first control node;

a fourth transistor configured to control a connection between the second control node and the low-potential node; and a fifth transistor configured to control a connection between the first control node and the second control node, and wherein a first electrode of the fifth transistor is physically and electrically connected to the first control node and the gate node of the first transistor, a second electrode of the fifth transistor is physically and electrically connected to a first electrode of the fourth transistor, and a second electrode of the fourth transistor is directly connected to the low-potential node directly connected to any one of first and second electrodes of the second transistor.

* * * * *